United States Patent
Anai et al.

(10) Patent No.: US 8,315,843 B2
(45) Date of Patent: *Nov. 20, 2012

(54) MULTI-OBJECTIVE OPTIMAL DESIGN SUPPORT DEVICE, METHOD AND PROGRAM STORAGE MEDIUM

(75) Inventors: Hirokazu Anai, Kawasaki (JP); Hitoshi Yanami, Kawasaki (JP); Tsuneo Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 875 days.

This patent is subject to a terminal disclaimer.

(21) Appl. No.: 12/347,648

(22) Filed: Dec. 31, 2008

(65) Prior Publication Data

US 2009/0182539 A1    Jul. 16, 2009

(30) Foreign Application Priority Data

Jan. 14, 2008  (JP) .................................. 2008-005104

(51) Int. Cl.
  G06F 7/60   (2006.01)
  G06F 17/10  (2006.01)
  G06F 9/44   (2006.01)
  G06F 13/10  (2006.01)
  G06F 13/12  (2006.01)
(52) U.S. Cl. ............................................. 703/2; 703/21
(58) Field of Classification Search ................... 703/1, 2, 703/7, 21
  See application file for complete search history.

(56) References Cited

U.S. PATENT DOCUMENTS

| 5,559,729 | A | 9/1996 | Abe |
| 6,865,567 | B1 | 3/2005 | Oommen et al. |
| 7,751,917 | B2 | 7/2010 | Rees et al. |
| 2005/0143845 | A1* | 6/2005 | Kaji ................................. 700/28 |
| 2006/0293817 | A1 | 12/2006 | Hagiwara et al. |
| 2007/0005313 | A1* | 1/2007 | Sevastyanov et al. ............ 703/2 |
| 2007/0090091 | A1 | 4/2007 | Adomaitis |
| 2007/0129930 | A1 | 6/2007 | Peralta et al. |
| 2007/0179917 | A1 | 8/2007 | Patel et al. |
| 2007/0213959 | A1 | 9/2007 | Kropaczek et al. |
| 2009/0182538 | A1* | 7/2009 | Yanami et al. .................... 703/2 |
| 2009/0182695 | A1* | 7/2009 | Yanami et al. .................. 706/19 |
| 2009/0326875 | A1* | 12/2009 | Yanami et al. .................... 703/1 |

(Continued)

FOREIGN PATENT DOCUMENTS

JP         7-105250 A     4/1995

(Continued)

OTHER PUBLICATIONS

Office Action issued by the Canadian Patent and Trademark Office for CA Application No. 2,648,796, mailed Aug. 19, 2011.

(Continued)

*Primary Examiner* — Mary C Jacob
*Assistant Examiner* — Aniss Chad
(74) *Attorney, Agent, or Firm* — Fujitsu Patent Center

(57) ABSTRACT

An objective function can be mathematically approximated using a prescribed number of sample sets of design parameters and sets of a plurality of objective functions computed corresponding to them. A logical expression indicating a relation between or among arbitrary two or three objective functions of the plurality of mathematically approximated objective functions is computed as an inter-objective-function logical expression and a region that the arbitrary objective function values can take is displayed as a feasible region in an objective space corresponding to the arbitrary objective functions. Furthermore, a point or area in a design space corresponding to arbitrary design parameters corresponding to a point or area specified by a user in the displayed feasible region is displayed.

13 Claims, 24 Drawing Sheets

U.S. PATENT DOCUMENTS

| | | | | |
|---|---|---|---|---|
| 2009/0326881 | A1* | 12/2009 | Anai et al. | 703/2 |
| 2011/0022365 | A1* | 1/2011 | Iwane et al. | 703/2 |

FOREIGN PATENT DOCUMENTS

| | | |
|---|---|---|
| JP | 7-164815 | 6/1995 |
| JP | 11-328239 A | 11/1999 |
| JP | A 2002-117018 | 4/2002 |
| JP | 2003-039180 | 2/2003 |
| JP | 2003-039184 | 2/2003 |
| JP | 2004-118719 | 4/2004 |
| JP | A 2005-70849 | 3/2005 |
| JP | 2005-519384 | 6/2005 |
| JP | 2006-285381 A | 10/2006 |
| JP | 2006-344200 A | 12/2006 |
| WO | WO 03/075129 A3 | 9/2003 |

OTHER PUBLICATIONS

Rudholm et al., "A method for simulation based optimization using radial basis functions," Master's Thesis, Department of Mathematics, Chalmers University of Technology Göteborg Sweden 2007.

Eddy et al., "Visualization of Multidimensional Design and Optimization Data Using Cloud Visualization," Proceedings of DETC;01, ASME 2002 International Design Engineering Technical Conferences and Computers and Information in Engineering Conference (IDETC/CIE2002), Sep. 29-Oct. 2, 2002, Montreal, Quebec, Canada.

Agrawal et al., "Intuitive Visualization of Pareto Frontier for Multi-Objective Optimization in n-Dimensional Performance Space," $10^{th}$ AIAA/ISSMO Multidisciplinary Analysis and Optimization Conference, Aug. 30-Sep. 1, 2004, Albany, New York.

Anai et al.; "Introduction to Actually Computed Algebra and Geometry: Summary of CAD and QE"; Mathematic Seminar, Nov. 2007, pp. 64-70.

Office Action issued by the United States Patent and Trademark Office for U.S. Appl. No. 12/347,585, mailed May 10, 2011.

Guan-Chun Luh, Chung-Huei Chueh, Multi-Objective Optimal Design of Truss Structure with Immune Algorithm, Computers & Structures, pp. 829-844, Science Direct, Elsevier Ltd. 2004.

Volker Weispfenning, Simulation and Optimization by Quantifier Elimination, J. Symbolic Computation, 24, pp. 189-208, Aug. 1997.

M. Delinitz, O. Schutze, T. Hestermeyer, Covering Pareto Sets by Multilevel Subdivision Techniques, Journal of Optimization Theory and Applications: vol. 124, No. 1, pp. 113-136, Jan. 2005.

Office Action issued by the Canadian Patent and Trademark Office for CA Application No. 2,648,669, mailed Aug. 26, 2011.

Office Action issued by the Canadian Patent and Trademark Office for CA Application No. 2,648,795, mailed Aug. 24, 2011.

* cited by examiner

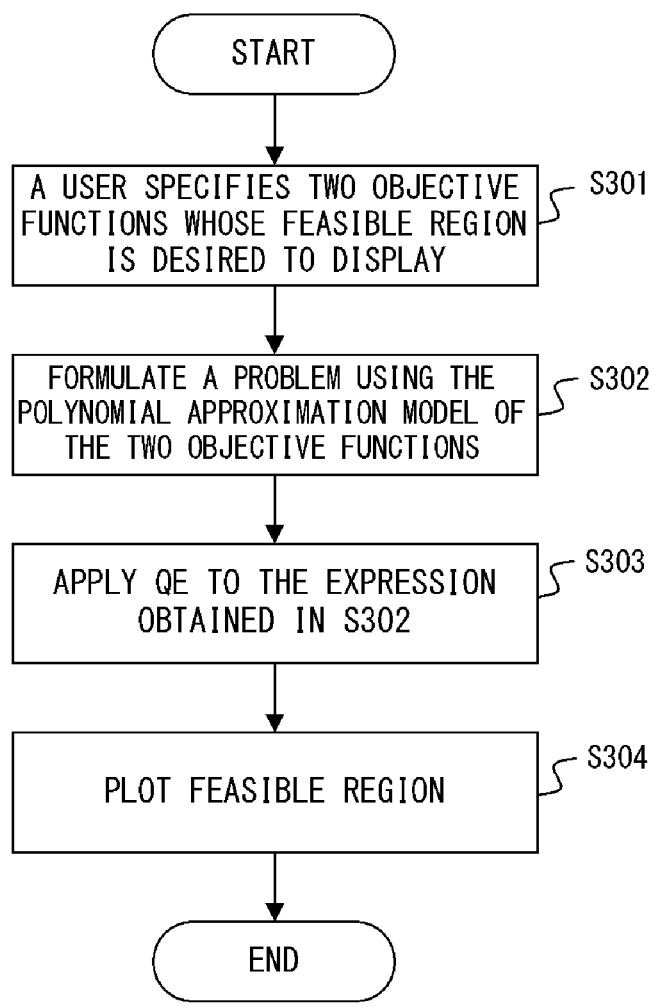
F I G. 4 A

|    | A        | B        | C        | D        | E        | F        | G        | H        | I        |
|----|----------|----------|----------|----------|----------|----------|----------|----------|----------|
| 1  | cost2    | x1       | x2       | x3       | x4       | x5       | x6       | x7       | x8       |
| 2  | 9.00E+00 | 5.00E-01 | 5.00E-01 | 5.00E-01 | 5.00E-01 | 5.00E-01 | 5.00E-01 | 5.00E-01 | 5.00E-01 |
| 3  | 9.43E+00 | 1.67E-01 | 5.00E-01 | 5.00E-01 | 5.00E-01 | 5.00E-01 | 5.00E-01 | 5.00E-01 | 5.00E-01 |
| 4  | 9.70E+00 | 8.33E-01 | 5.00E-01 | 5.00E-01 | 5.00E-01 | 5.00E-01 | 5.00E-01 | 5.00E-01 | 5.00E-01 |
| 5  | 9.10E+00 | 5.00E-01 | 1.67E-01 | 5.00E-01 | 5.00E-01 | 5.00E-01 | 5.00E-01 | 5.00E-01 | 5.00E-01 |
| 6  | 9.40E+00 | 5.00E-01 | 8.33E-01 | 5.00E-01 | 5.00E-01 | 5.00E-01 | 5.00E-01 | 5.00E-01 | 5.00E-01 |
| 7  | 4.54E+00 | 5.00E-01 | 5.00E-01 | 1.67E-01 | 5.00E-01 | 5.00E-01 | 5.00E-01 | 5.00E-01 | 5.00E-01 |
| 8  | 1.16E+01 | 5.00E-01 | 5.00E-01 | 8.33E-01 | 5.00E-01 | 5.00E-01 | 5.00E-01 | 5.00E-01 | 5.00E-01 |
| 9  | 1.05E+01 | 5.00E-01 | 5.00E-01 | 5.00E-01 | 1.67E-01 | 5.00E-01 | 5.00E-01 | 5.00E-01 | 5.00E-01 |
| 10 | 2.05E+00 | 5.00E-01 | 5.00E-01 | 5.00E-01 | 8.33E-01 | 5.00E-01 | 5.00E-01 | 5.00E-01 | 5.00E-01 |
| 11 | 4.10E+00 | 5.00E-01 | 5.00E-01 | 5.00E-01 | 5.00E-01 | 1.67E-01 | 5.00E-01 | 5.00E-01 | 5.00E-01 |
| 12 | 1.52E+01 | 5.00E-01 | 5.00E-01 | 5.00E-01 | 5.00E-01 | 8.33E-01 | 5.00E-01 | 5.00E-01 | 5.00E-01 |
| 13 | 5.29E+00 | 5.00E-01 | 5.00E-01 | 5.00E-01 | 5.00E-01 | 5.00E-01 | 1.67E-01 | 5.00E-01 | 5.00E-01 |
| 14 | 1.10E+01 | 5.00E-01 | 5.00E-01 | 5.00E-01 | 5.00E-01 | 5.00E-01 | 8.33E-01 | 5.00E-01 | 5.00E-01 |
| 15 | 1.02E+01 | 5.00E-01 | 5.00E-01 | 5.00E-01 | 5.00E-01 | 5.00E-01 | 5.00E-01 | 1.67E-01 | 5.00E-01 |
| 16 | 3.96E+00 | 5.00E-01 | 5.00E-01 | 5.00E-01 | 5.00E-01 | 5.00E-01 | 5.00E-01 | 8.33E-01 | 5.00E-01 |
| 17 | 4.86E+00 | 5.00E-01 | 5.00E-01 | 5.00E-01 | 5.00E-01 | 5.00E-01 | 5.00E-01 | 5.00E-01 | 1.67E-01 |
| 18 | 1.47E+01 | 5.00E-01 | 5.00E-01 | 5.00E-01 | 5.00E-01 | 5.00E-01 | 5.00E-01 | 5.00E-01 | 8.33E-01 |
| 19 | 4.24E+00 | 1.67E-01 | 5.00E-01 | 5.00E-01 | 5.00E-01 | 1.67E-01 | 5.00E-01 | 5.00E-01 | 5.00E-01 |
| 20 | 4.95E+00 | 8.33E-01 | 5.00E-01 | 5.00E-01 | 5.00E-01 | 1.67E-01 | 5.00E-01 | 5.00E-01 | 5.00E-01 |
| 21 | 4.57E+00 | 5.00E-01 | 1.67E-01 | 5.00E-01 | 5.00E-01 | 1.67E-01 | 5.00E-01 | 5.00E-01 | 5.00E-01 |
| 22 | 4.89E+00 | 5.00E-01 | 8.33E-01 | 5.00E-01 | 5.00E-01 | 1.67E-01 | 5.00E-01 | 5.00E-01 | 5.00E-01 |
| 23 | 3.56E+00 | 5.00E-01 | 5.00E-01 | 1.67E-01 | 5.00E-01 | 1.67E-01 | 5.00E-01 | 5.00E-01 | 5.00E-01 |
| 24 | 7.63E+00 | 5.00E-01 | 5.00E-01 | 8.33E-01 | 5.00E-01 | 1.67E-01 | 5.00E-01 | 5.00E-01 | 5.00E-01 |

FIG. 5

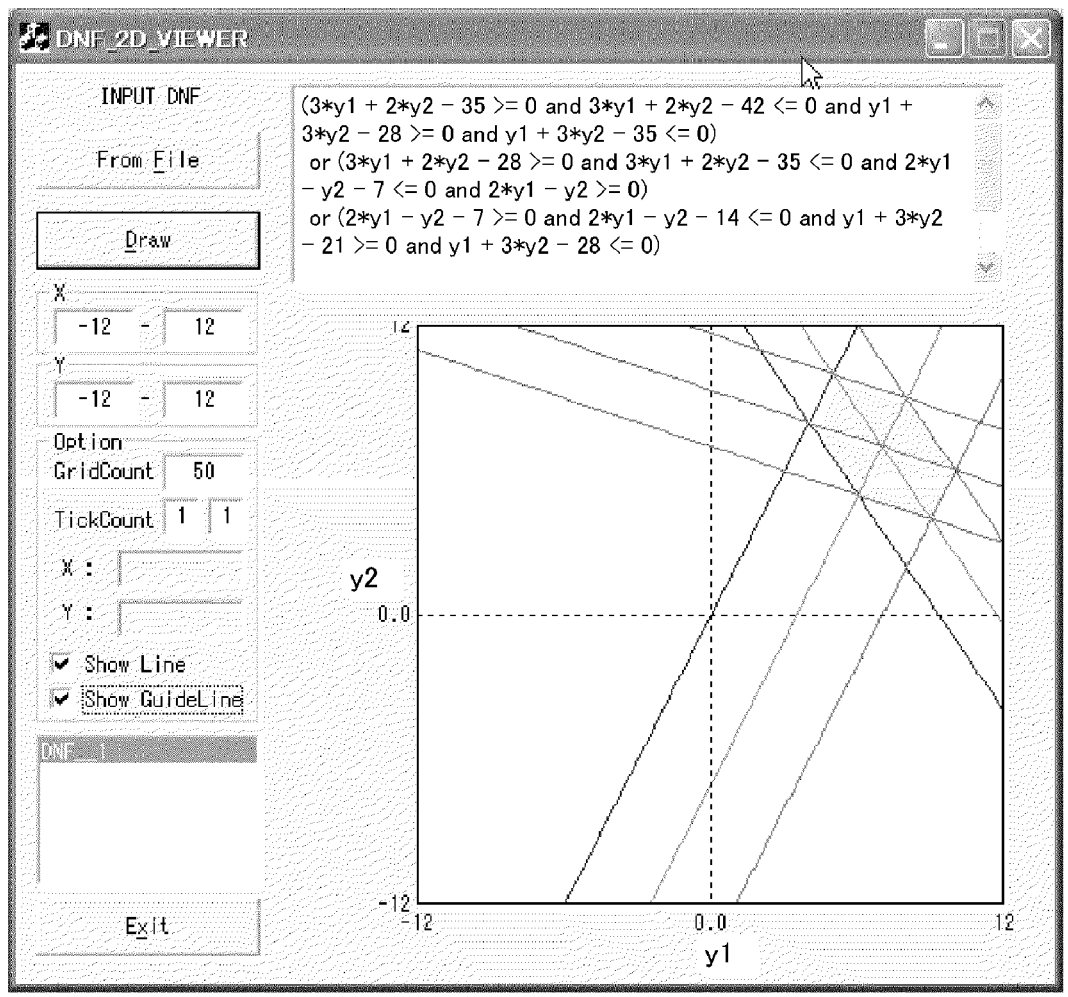
F I G. 7

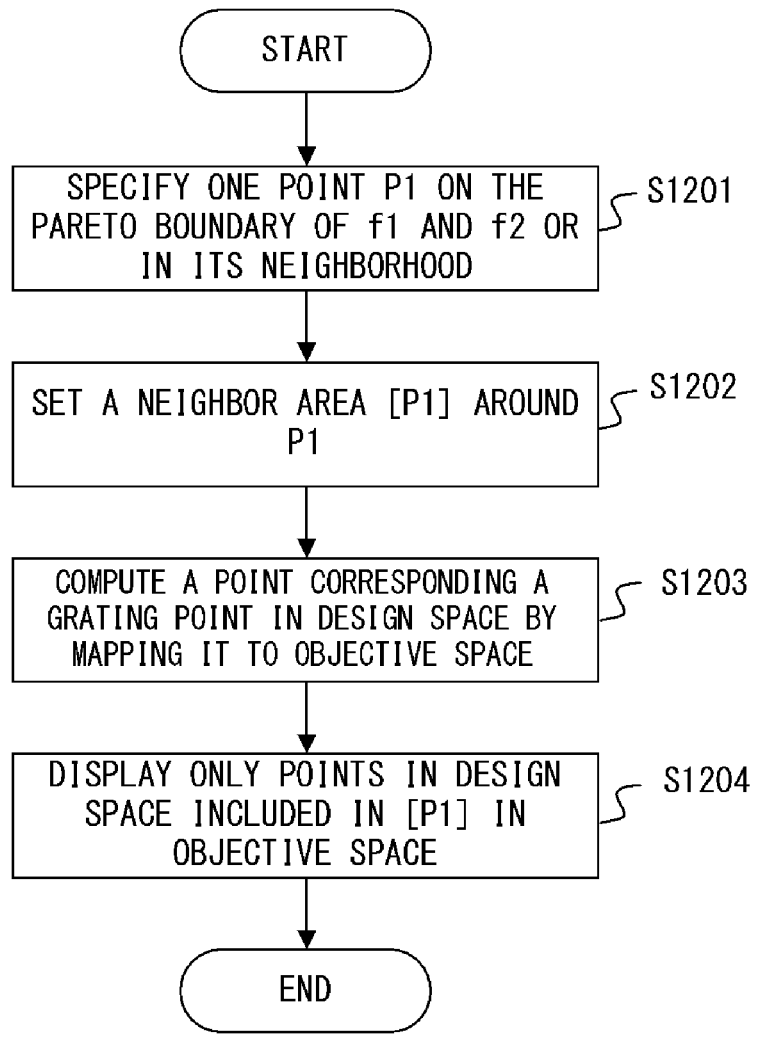
F I G. 1 2

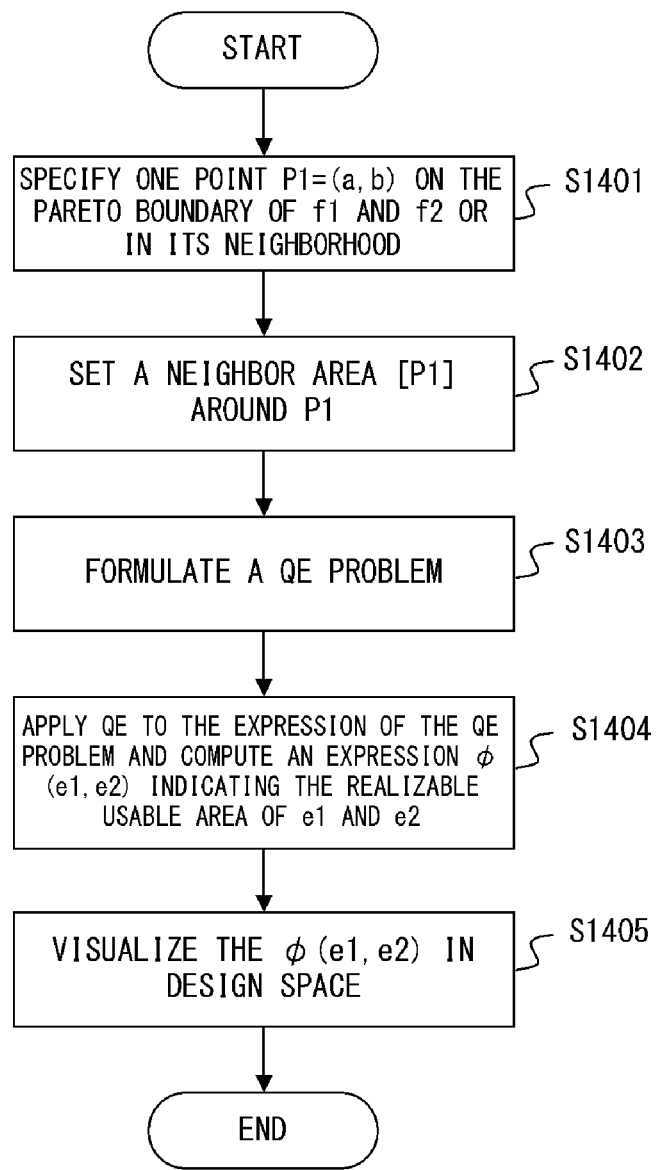
F I G. 14

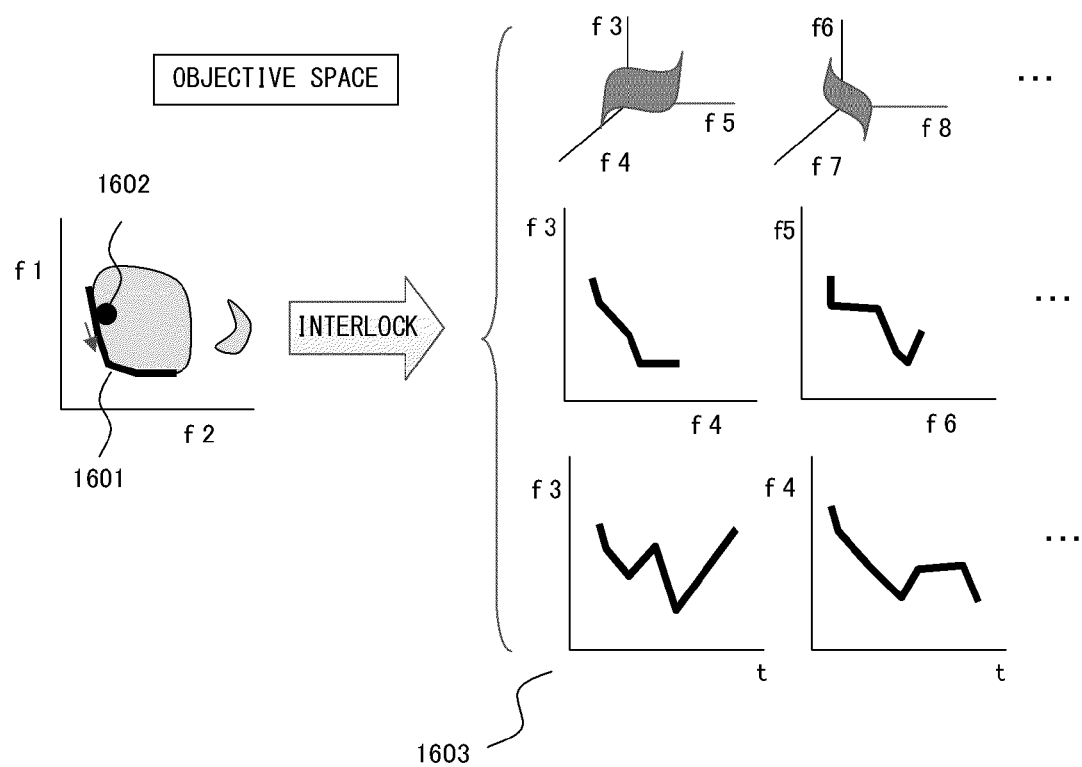
F I G. 16

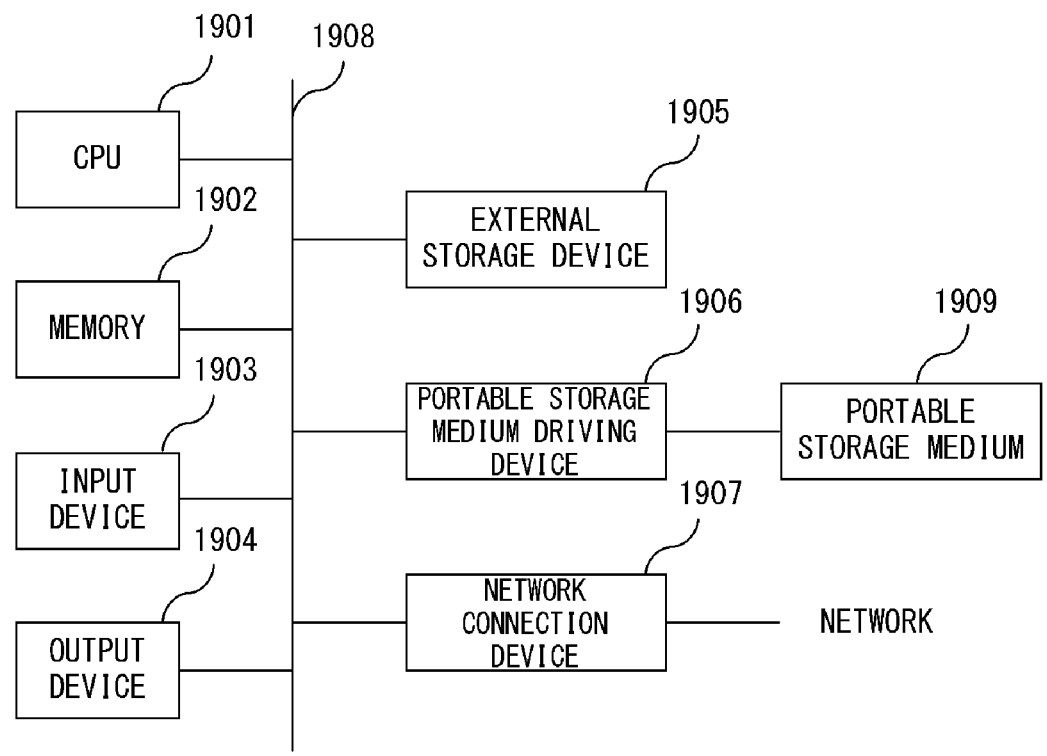
F I G. 19

MULTI-OBJECTIVE OPTIMAL DESIGN SUPPORT DEVICE, METHOD AND PROGRAM STORAGE MEDIUM

BACKGROUND OF THE INVENTION

1. Field of the Invention

The present invention relates to a multi-objective optimal design support technique used in the design of a slider shape of a hard disk and the like.

2. Description of the Related Arts

Along with the high-density/high capacity of a hard disk, a distance between a magnetic disks and a header has been more and more reduced. A slider design with a small amount of fly variations due to an altitude difference and a disk diameter position is required.

As represented as 2001 in FIG. 1A, a slider is installed in the tip lower part of an actuator 2002 moving on a magnetic disk in a hard disk and the position of a header is computed on the basis of the shape of the slider 2001.

When determining the optimal shape of the slider 2001, an efficient computation for simultaneously minimizing the function of flying height (2003 in FIG. 1A), roll (2004) and pitch (2005), so-called multi-objective optimization is required.

Conventionally, instead of directly handling a multi-objective optimization problem, a single-objective optimization in which as shown below, the linear sum f of terms obtained by multiplying each objective function f_i by weight m_i and its minimum value is computed, is performed, $$f = m\_1 * f\_1 + \ldots + m\_t * f\_t \quad (1)$$

Then, a function value f is computed while parameters p, q, r and the like, for determining a slider shape S shown in FIG. 1B are being modified little by little by a program, and the slider shape S in which the function value f is minimized is computed.

In the above equation, f depends on weight vector {m_i} In actual design, the minimum value of f for each modification value is computed while further modifying {m_i} and a slider shape is determined by comprehensively taking into consideration the balance between the minimum value and {m_i}.

In the multi-objective optimization process performed by the above-described method, the number of optimal solutions to be computed is not always one.

For example, when in the design of a certain product an objective function value 1 of "reducing its weight" and an objective function value 2 of "reducing its cost" are optimized, the objective function values 1 and 2 can take various coordinate values in two-dimensional coordinate system, as shown in FIG. 1C depending on how to give design parameters.

Since it is required that the objective function values 1 and 2 take small values independently (the product is light and inexpensive), a point on a line 2203 connecting computed points 2201-1, 2201-2, 2201-3, 2201-4 and 2201-5 shown in FIG. 1C or a point in its vicinity can be an optimal solution group. These are called Pareto optimal solutions. Of these computed values, the point 2201-1 corresponds to a model which is expensive but light, and the point 2201-5 corresponds to a model which is inexpensive but not light. However, since the points 2202-1 and 2202-2 can be made lighter and more inexpensive, they cannot be optimal solutions. These are called inferior solutions.

In this way, in a multi-objective optimization process, it is very important to be able to properly obtain a Pareto optimal solution. For that purpose, it is important for the Pareto optimal solution of a desired objective function to be able to properly visualize.

As a prior art for obtaining such a Pareto optimal solution, a so-called normal boundary intersection (NBI) method for computing a Pareto curved surface in multi-objective optimization (optimal curved surface) by a numerical analysis method and the like are known. In such a technique, for example, when in the above-described slider design, a certain design specification and factor parameters are given, the relation between desired objective function values (pitch, the amount of fly, etc.) can be plotted as shown in 2301 of FIG. 1D by numerically computing them.

As other prior arts, a technique for displaying a Pareto curve by points or plotting and a technique for displaying objective functions by a trade-off chart are also known, as shown in FIG. 1E.

Furthermore, the following Patent documents are also known. Patent document 1 discloses a technique for classify a plurality of design points in a design space by color and realizing three-dimensional plotting. Patent document 2 discloses a technique for realizing three-dimensional plotting by contour display. Patent document 3 discloses a technique for realizing two-dimensional plotting by a unified evaluation index vs. cost.

Patent document 1: Japanese Patent Application Laid-open No. 2005-70849

Patent document 2: Japanese Patent Application Laid-open No. 2003-39184

Patent document 3: Japanese Patent Application Laid-open No. 2004-118719

However, in the optimization technique of the single-objective function f in the earlier-described prior art, flying height computation which takes much time to conduct must be repeated. In particular, when probing up to the fine parts of a slider shape, the number of input parameters (corresponding to p, q, r and the like in FIG. 1B) becomes around 20 and 10,000 times or more of flying height computation are necessary. Therefore, optimization takes very much time.

Furthermore, in this method, the minimum value of f (and input parameter values for the minimum value) depends on how to determine weight vectors (m_1, . . . m_t). In actual design, a situation in which it is desired that f should be optimized for various sets of weight vectors frequently occurs. However, in the above-described prior art, since it is necessary to do an optimization computation accompanying expensive flying height computation over again from the beginning every time modifying a weight vector, the number of types of weight vectors to attempt is limited.

Furthermore, since the minimization of a function value f can be applied to only one point on the Pareto curved surface, it is difficult to predict an optimal relation between objective functions and also such information cannot be fed back to design.

As described above, conventionally, since a multi-objective optimization process itself takes very much time, it is difficult even to display a correct Pareto optimal solution.

In the earlier-described prior art of computing a Pareto curved surface by a numerical analysis method, if the feasible region is non-convex, it cannot be solved. If points (end points) being a source for computing a Pareto curved surface are close to each other, the algorism does not work well. Furthermore, in the acquisition of a Pareto optimal solution, since a simple plotting display is provided if objective function values are displayed as coordinates, as shown in FIG. 1D, it is difficult to determine where is located a Pareto optimal solution.

Furthermore, even in the prior art which is devised to display a Pareto optimal solution, as shown in FIG. 1E, the Pareto optimal solution is simply displayed. For example, when a Pareto optimal solution is obtained between two or three objective functions, a relation between an objective function and a design parameter cannot be obtained. Alternatively, the degree of contribution of another objective function cannot be obtained.

SUMMARY OF THE INVENTION

It is an object of the present invention to realize visualization (the display of a Pareto boundary, etc.)in a multi-objective optimal design on the basis of an objective function in a short time and to enable the acquisition of a relationship between an objective function and a design parameter, and the degree of contribution of another objective function while properly displaying a Pareto optimal solution on the basis of the visualization.

The aspect of the present invention presumes a design support device for supporting the determination of an optimal set of design parameters by inputting a plurality of sets of design parameters (input parameters), computing a plurality of objective functions according to prescribed computation and applying a multi-objective optimization process to the plurality of objective functions. The design parameters are, for example, parameters for determining the shape of the slider unit of a hard-disk magnetic storage device.

The first aspect of the present invention has the following configuration.

A sample-set objective function computation unit (for example, 101 in FIG. 2) computes sets of a plurality of objective functions corresponding to a prescribed number of sample sets of design parameters.

An objective function approximation unit (for example, 102 in FIG. 2) mathematically approximates the objective functions using the prescribed number of the sample sets of the design parameters and the plurality of sets of objective functions computed corresponding to them.

An inter-objective-function logical expression computation unit (for example, 103 in FIG. 2) computes a logical expression indicating a logical relation between arbitrary two or three objective functions of the plurality of mathematically approximated objective functions as an inter-objective-function logical expression.

An objective space display unit (for example,104 in FIG. 2) displays a region that values of the arbitrary objective functions can take as a feasible region in an objective space corresponding to the arbitrary objective functions according to the inter-objective-function logical expression.

An objective space corresponding design space display unit (for example, 104 in FIG. 2) displays a point or area on a design space corresponding to an arbitrary design parameter corresponding to a point or area specified by a user in the feasible region in the objective space corresponding to the arbitrary objective functions displayed by the objective space display unit. For example, this objective space corresponding design space display unit displays a grating point corresponding to a point or area specified by a user in the feasible region of the objective space computed according to the inter-objective-function logical expression, of grating points at prescribed intervals in a design space corresponding to an arbitrary design parameter. Alternatively, this objective space corresponding design space display unit computes a logical expression indicating a logical relation between the objective space and the design space and displays a point or area in the design space corresponding to a point or area specified by a user in the feasible region of the objective space according to the logical expression.

The second aspect of the present invention has the following configuration.

Its sample-set objective function computation unit, its objective function approximation unit, its inter-objective function logical expression computation unit and its objective space display unit are the same as those in the first aspect of the present invention.

Its objective space corresponding design space display unit (for example, 104 in FIG. 2) computes a point or area on design space corresponding to an arbitrary design parameter corresponding to a point or area specified by a user in the feasible region in the objective space corresponding to an arbitrary objective function displayed by the objective space display unit.

A comparison-target objective space display unit (for example, 104 in FIG. 2) displays a point or area corresponding to the point or area in the design space computed by the objective space-corresponding design space computation unit in a comparison-target objective space corresponding to an arbitrary comparison-target objective function specified by the user as a comparison target.

BRIEF DESCRIPTION OF THE DRAWINGS

FIG. 4A is the operational flowchart of feasible region display by a formula manipulation (No. 1).
FIG. 5 shows examples of sample sets of input parameters 107 and each objective function value corresponding to them.
FIG. 7 shows an example of feasible region display (No. 2).
FIG. 12 is the operational flowchart of the first function of the feasible region display unit 104 (No. 1).
FIG. 14 is the operational flowchart of the first function of the feasible region display unit 104 (No. 2).

FIG. 16 explains the second function of the feasible region display unit 104 (No. 1).

FIG. 19 shows one example of the hardware configuration of a computer capable of realizing a system according to the preferred embodiment of the present invention.

DESCRIPTION OF THE PREFERRED EMBODIMENTS

The preferred embodiments of the present invention are described in detail below with reference to the drawings.
<Configuration of the Preferred Embodiment of the Present Invention>

Figure 2:
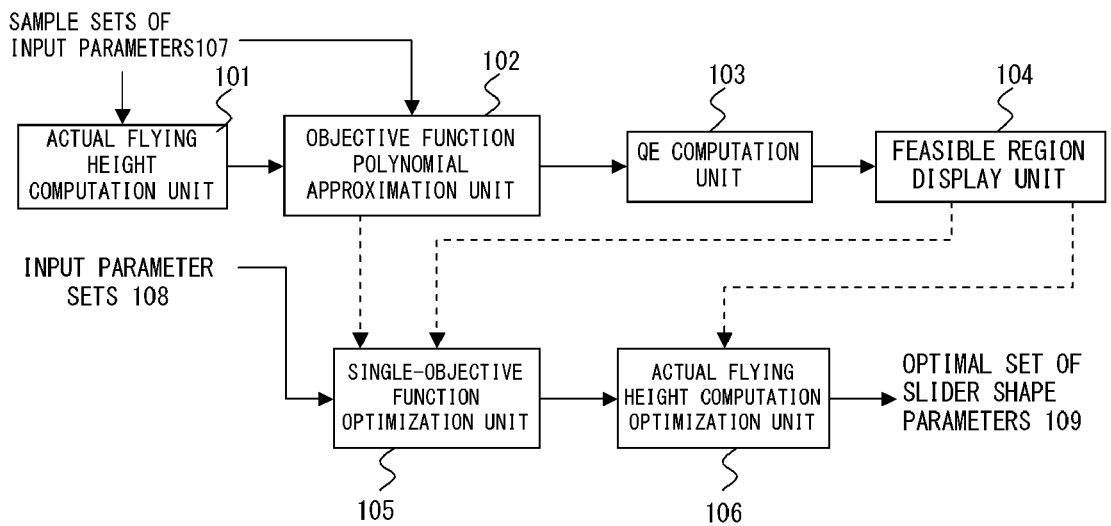
FIG. 2 shows the functional block diagram of the preferred embodiment of the present invention.

FIG. 2 shows the functional block diagram of the preferred embodiment of the present invention.

An actual flying height computation unit 101 inputs sample sets of input parameters 107 of the slider shape of a hard disk, applies slider flying height computation to each set and outputs each objective function value. In this case, the number of the sample sets of input parameters 107 is at most approximately several hundreds.

An objective function polynomial approximation unit 102 approximates each objective function of the slider shape by the polynomial of a multiple regression equation and the like based on a multiple regression analysis, using the sample sets of input parameters 107 and each objective function value of each set, computed by the actual flying height computation unit 101. Although in this preferred embodiment, approximation is performed on the basis of multiple regression analysis, other generally known polynomial approximation methods, such as various types of polynomial interpolation, approximation by increasing the degree of a polynomial and the like can be used.

A quantifier elimination (QE) computation unit 103 computes a logical expression between arbitrary two objective functions by a QE method, using each objective function polynomial computed by the objective function polynomial approximation unit 102 and the constraint of the sample sets of input parameters 107 (sets of input parameters 108).

A feasible region display unit 104 displays the feasible region of an objective function on a computer display, which is not in particular shown in FIG. 2, according to the logical expression between the arbitrary two objective function logical expression computed by the QE computation unit 103. This part is most related to the present invention and enables the acquisition of a relation between an objective function and a design parameter, the degree of contribution of another objective function and the like while accurately displaying a Pareto optimal solution.

A single objective function optimization unit 105 computes the single objective function value obtained as the weighted linear sum of the objective functions for the input parameter sets 108, using each objective function polynomial computed by the objective function polynomial approximation unit 102 and the weight vector determined by a user in the feasible region display unit 104 and computes a candidate of the input parameter set 108 whose single-objective function value becomes a minimum. The number of input parameter sets 108 is 10,000 to 20,000 sets.

An actual flying height computation optimization unit 106 outputs input parameter sets 108 candidate whose single-objective function value becomes a minimum by applying detailed flying height computation to the input parameter set 108 candidate whose single-objective function value computed by the single objective function optimization unit 105 becomes a minimum and computing a single-objective function value obtained as the weighted linear sum of objective functions determined by the detailed flying height computation as an optimal set of slider-shape parameters 109. In this case, for each objective function, one obtained by the actual flying height computation is used, and for the weight vector, the same one as used in the single-objective function optimization unit 105 or one obtained by modifying it somewhat is used.

The operation of the preferred embodiment of the present invention having the above configuration is described below.
<Basic Operation of the Present Invention>

Firstly, the basic operation of the present invention is described below according to the operation flowcharts shown in FIGS. 3~4B and with reference to the operational explanations shown in FIGS. 5~8.

Figure 3:
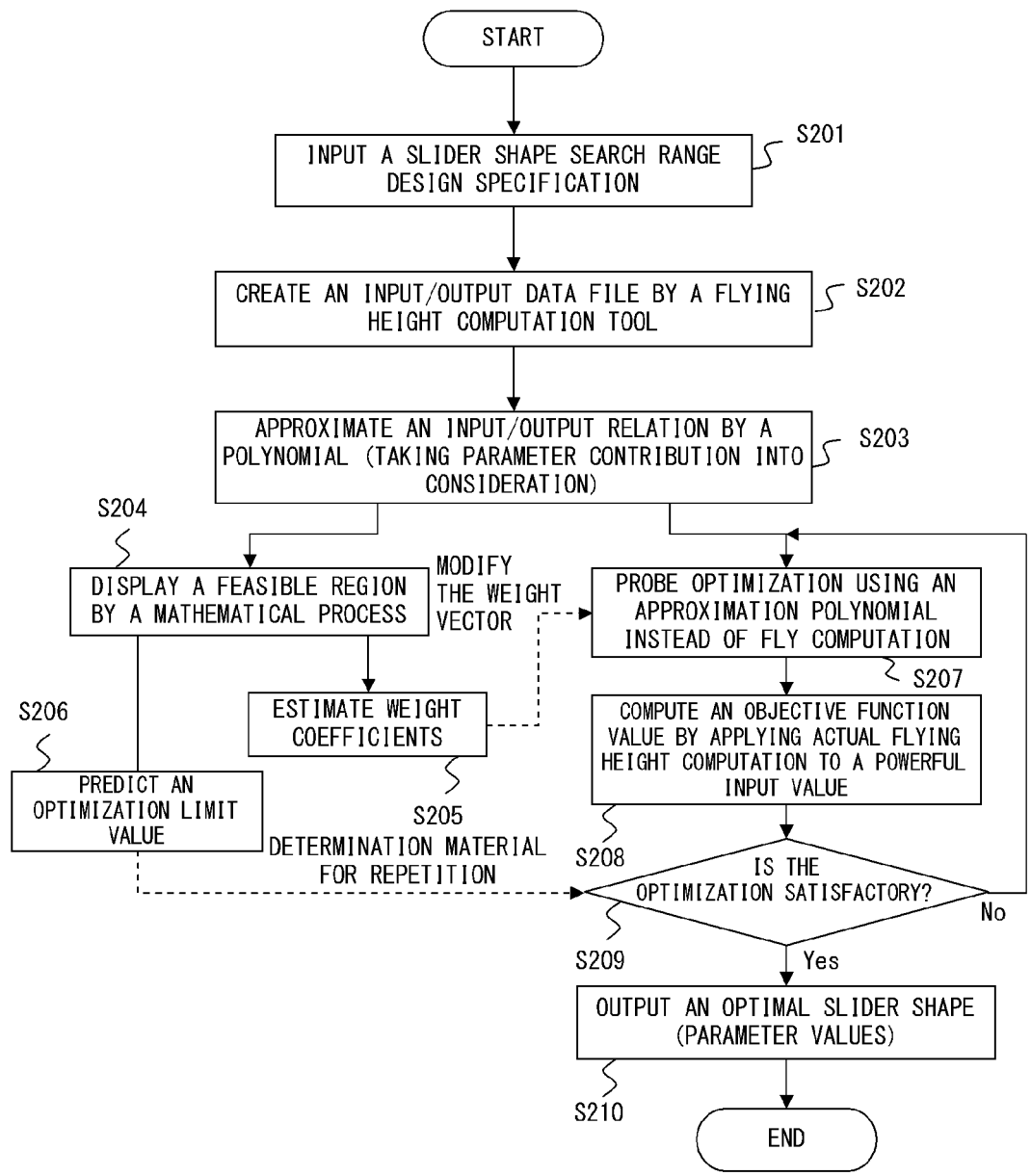
FIG. 3 is the operational flowchart of the entire process of the preferred embodiment of the present invention.

FIG. 3 is the operational flowchart of the entire process of the preferred embodiment of the present invention performed by a system having the functional block configuration shown in FIG. 2.

Firstly, the actual flying height computation unit 101 shown in FIG. 2 inputs several-hundred sample sets of input parameters 107 as a slider shape search range design specification (step S201 in FIG. 3), applies slider flying height computation to each set and outputs each objective function value (step S202 in FIG. 3).

Thus, for example, the data file of the sample sets of input parameters 107 and their objective function values as shown in FIG. 5 is created. In FIG. 5, values in columns indicated as x1, . . . x8 are the sample sets of input parameters 107 and the values in a column indicated as cost2 are the values of a certain objective function.

Then, the objective function polynomial approximation unit 102 shown in FIG. 2 approximates each objective function of a slider shape by a polynomial of a multiple regression equation and the like based on a multiple regression analysis, using the sample sets of input parameters 107 and each objective function value computed for each set (S203 step in FIG. 3) in the data file.

As this result, the polynomial of an objective function as exemplified below can be obtained.

$$f1:=99.0424978610709132- \\ 6.83556672325811121*x1+14.0478279657713 \\ 188*x2-18.6265540605823148*x3- \\ 28.3737252180449389*x4- \\ 2.42724827545463118*x5+ \\ 36.9188200131846998*x6-46.762070412 \\ 8296296*x7+1.05958887094079946*x8+ \\ 6.50858043416747911*x9-11.318111074 \\ 5759242*x10-6.35438297722882960*x11+ \\ 4.85313298773917622*x12-11.1428988 \\ 07281405*x\lceil 13\rceil+35.3305897914634315*x14- \\ 53.2729720194943113*x15; \quad (2)$$

In this case, the slider design has a tendency that the types of input parameters increase as its work progresses. It can be estimated that of these (due to the influences of other parameters), there are parameters whose contribution to a certain objective function is low. Therefore, approximation by a simpler polynomial becomes possible by incorporating a routine for eliminating parameters whose contribution is low by a multiple regression analysis and the like, into the process. When a designer inputs the number of parameters used to analyze, the objective function polynomial approximation unit 102 narrows the number of the parameters down up to its setting number. By this parameter reduction process, the amount of computation can be reduced at the computation time of a QE method which will be described later.

As this result, the polynomial of an objective function whose number of parameters is reduced, as exemplified below can be obtained.

$$f1 := 100.236733508603720 - \qquad (3)$$
$$.772229409006272793 * x1 - 20.7218054045105654 * x3 -$$
$$5.61123555392073126 * x5 + 27.4287250065600468 * x6 -$$
$$52.6209219228864030 * x7 + 2.86781289549098428 * x8 -$$
$$1.51535612687246779 * x11 - 51.1537286823153181 * x15;$$

(Reduced from 15 to 8 variables)

As described above, the preferred embodiment of the present invention can obtain an objective function approximated by a polynomial based on a multiple regression equation and the like, using at most several hundred sample sets of input parameters 107. It is because in slider design, firstly there is the initial shape of a slider and its optimization is performed while swinging parameters for determining this initial shape within the specified range that an objective function can be approximated by a polynomial in this way. This is based on a view that in the optimization within such a local design modification range, initial optimization can be sufficiently effectively performed by linear approximation by a multiple regression equation and the like.

The preferred embodiment of the present invention can realize a very efficient design support system by using the objective function that is computed and mathematically processed thus in the former stage of the slider design, in particular, for the determination of a Pareto boundary, as described below.

Specifically, the QE computation unit 103 shown in FIG. 2 computes a logical expression between arbitrary two objective functions by a QE method, using each objective function polynomial computed by the objective function polynomial approximation unit 102 and the constraint of each parameter value of the sample sets of input parameters 107 (sets of input parameters 108) (step S204 in FIG. 3).

The algorism of the QE method implemented in step S204 is described below according to the operational flowchart shown in FIG. 4A.

Firstly, a user specifies two objective functions whose feasible region is desired to display. It is assumed that these are f1 and f2. In this case, three objective functions can also be specified.

Then, the QE computation unit 103 formulates a problem using the approximation polynomial of the two objective functions that are computed and specified by the objective function polynomial approximation unit 102 and the constraint of each parameter value of the sample sets of input parameters 107 (sets of input parameters 108) (step S302 in FIG. 4A). Thus, for example, a formulation as exemplified below can be obtained. Although in this example, the number of parameters is 15 and not reduced, it can also be reduced.

$$y1=f1(x1,\ldots,x5), y2=f2(x1,\ldots,x15)$$

Input parameters x1, . . . , x15 moves in the range of 0<=x_i<=1.

$$F:=\exists x_1 \exists x_2 \ldots \exists x_{15}; 0 \leq x_1 \leq 1 \text{ and } 0 \leq x_2 \leq 1 \text{ and } \ldots$$
$$\text{and } 0 \leq x_{15} \leq 1$$

$$\text{and } y_1 = f_1(x_1, \ldots x_{15}) \text{ and } y_2 = f_2(x_1, \ldots x_{15}) \qquad (4)$$

Then, the QE computation unit 103 solves the value F of expression (4) by a QE method (step S303 in FIG. 4A). As this result, as exemplified below, the input parameters x1 . . . x5 are eliminated and the logical expression of the two objective functions y1 and y2 is outputted. In the case of three objective functions, the logical expression of three objective functions y1, y2 and y3 is outputted.

$$y2<y1+1 \text{ and } y2>2 \text{ and } y2>2*y1-3 \qquad (5)$$

Although the detailed description of the QE method is omitted here, its processing method is disclosed in a publicly known literature by the applicant of the present invention, "Introduction to Computational Real Algebraic Geometry: Summary of CAD and QE" (Mathematics Seminar, No. 11, 2007, pp. 64-70 by Hirokazu Anai and Kazuhiro Yokoyama) and is used without any modification in the preferred embodiment of the present invention.

Then, the feasible region display unit 104 shown in FIG. 2 displays the feasible region of the two objective functions on a computer display according to the logical expression of arbitrary two objective functions computed by the QE computation unit 103 (step S204 in FIG. 3 and S304 in FIG. 4A).

More specifically, the feasible region display unit 104 continuously paints over points in which the logical expression of the two objective functions y1 and y2 computed by the QE computation unit 104, as exemplified as Expression (5) holds true while sweeping each point on the two-dimensional plotting plane of the two objective functions y1 and y2. As this result, a feasible region can be displayed, for example, in a form of a completely painted area shown in FIG. 6.

In the case of three objective functions, it is three-dimensionally displayed.

Another detailed example of the feasible region display process is described below.

It is assumed that the approximation polynomial of two objective functions is composed of three input parameters x1, x2 and x3, as exemplified below.

$$y1 = f1(x1, x2, x3) = x1 - 2*x2 + 3*x3 + 6$$

$$y2 = f2(x1, x2, x3) = 2*x1 + 3*x2 - x3 + 5 \qquad (6)$$

Equations (6) are formulated as follows.

$$F := \exists x_1 \exists x_2 \exists x_3; 0 \leq x_1 \leq 1 \text{ and } 0 \leq x_2 \leq 1 \text{ and } 0 \leq x_3 \leq 1$$

$$\text{and } y_1 = x_1 - 2x_2 + 3x_3 + 6 \text{ and } y_2 = 2x_1 + 3x_2 - x_3 + 5 \qquad (7)$$

When a QE method is further applied to Expression (7) the following expression can be obtained.

$$(3*y1+2*y2-35 \geq 0 \text{ and } 3*y1+2*y2-42 \leq 0 \text{ and}$$
$$y1+3*y2-28 \geq 0 \text{ and } y1+3*y2-35 \leq 0)$$

$$\text{or } (3*y1+2*y2-28 \geq 0 \text{ and } 3*y1+2*y2-35 \leq 0 \text{ and}$$
$$2*y1-y2-7 \geq 0 \text{ and } 2*y1-y2 \geq 0)$$

$$\text{or } (2*y1-y2-7 \geq 0 \text{ and } 2*y1-y2-14 \leq 0 \text{ and}$$
$$y1+3*y2-21 \geq 0 \text{ and } y1+3*y2-28 \leq 0) \qquad (8)$$

When plotting a feasible region according to Expression (8), for example, FIG. 7 is obtained. In FIG. 7, oblique straight lines indicate respective logical boundaries of Logical expression (8) and a completely painted area is the feasible region of the two objective functions.

As clear from the display shown in FIG. 7, in the completely painted feasible region, the Pareto boundary of the two objective functions can be easily recognized as a boundary in the lower edge part near the coordinate origin intuitively and an optimization limit area can be recognized. Although in the case of three objective functions, the Pareto boundary becomes a curved surface (Pareto curved surface), it can be three-dimensionally displayed.

Furthermore, when computing a weight sum single objective function (see Expression (1)) on the basis of two objective functions, the optimal value of the ratio of weight values between the two objective functions in a weight vector can be estimated by recognizing the overall inclination of the feasible region.

Although in this example, it is assumed in Expression (7) that each input parameter constituting the sample sets of input parameters 107 have a constraint of freely taking a value between 0 and 1, it is anticipated that actually a better result can obtained if the center point of the input parameter is specified and the value is moved in a specific range.

Figure 4B:
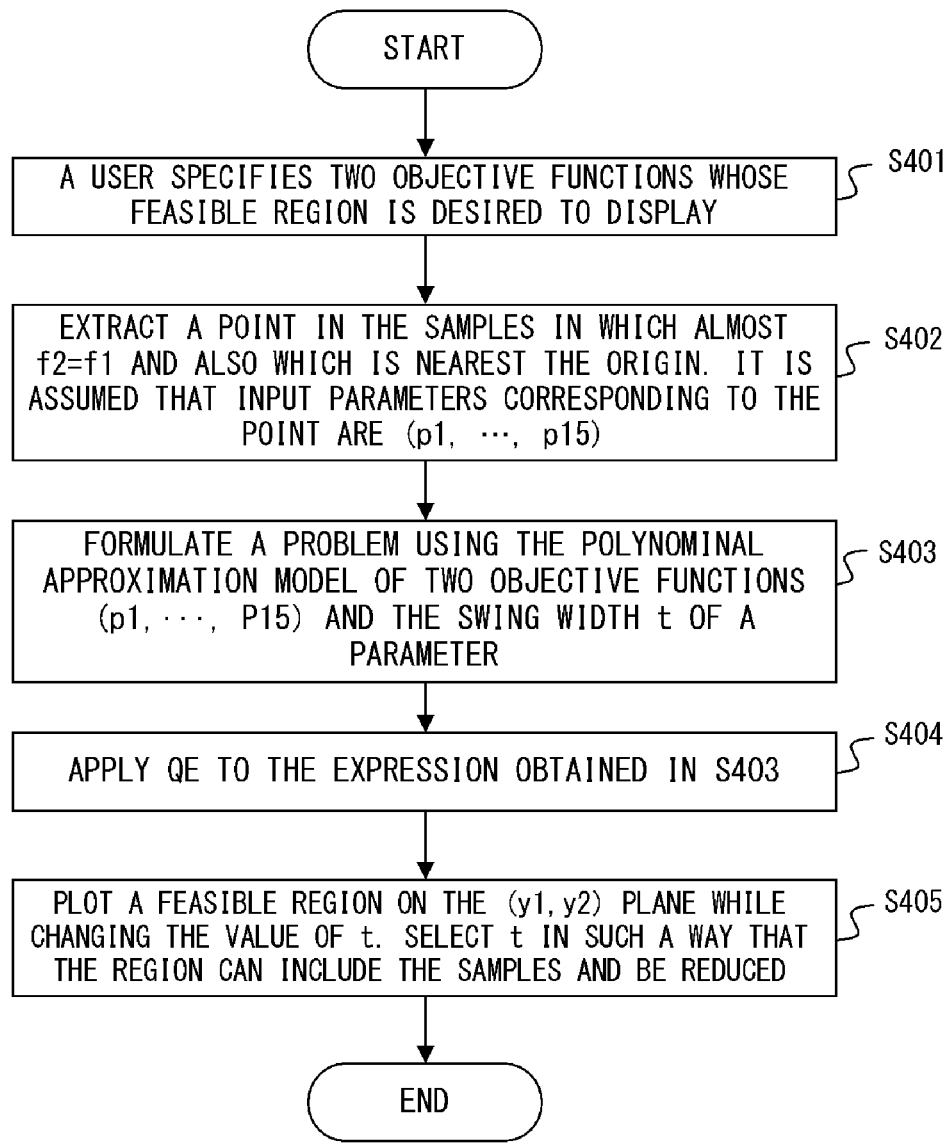
FIG. 4B is the operational flowchart of feasible region display by a formula manipulation (No. 2).
Figure 6:
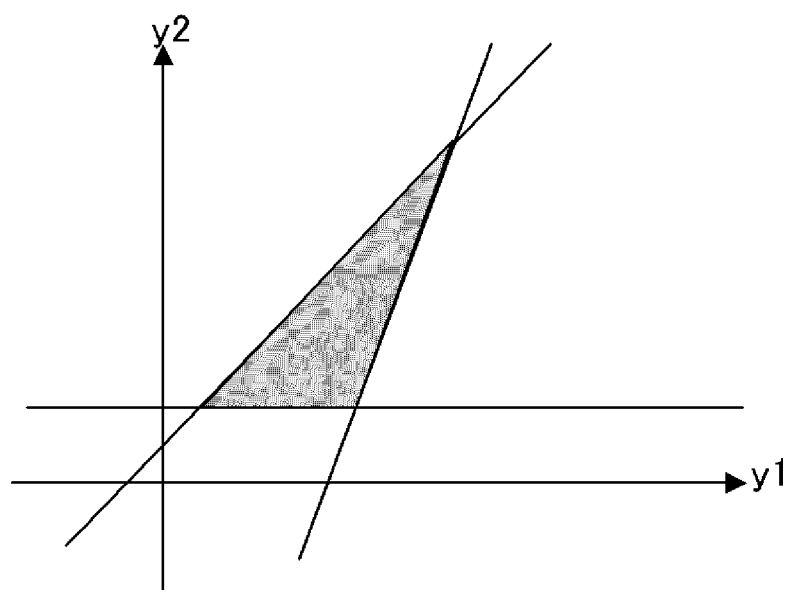
FIG. 6 shows an example of feasible region display (No. 1).

In order to enable such an operation, the QE computation unit 103 and the feasible region display unit 104 that are shown in FIG. 2 implement the operational flowchart shown in FIG. 4B instead of the operational flow chart shown in FIG. 4A.

Firstly, a user specifies two objective functions whose feasible region is desired to display (step S401 in FIG. 4B) It is assumed that these are f1 and f2.

Figure 8:
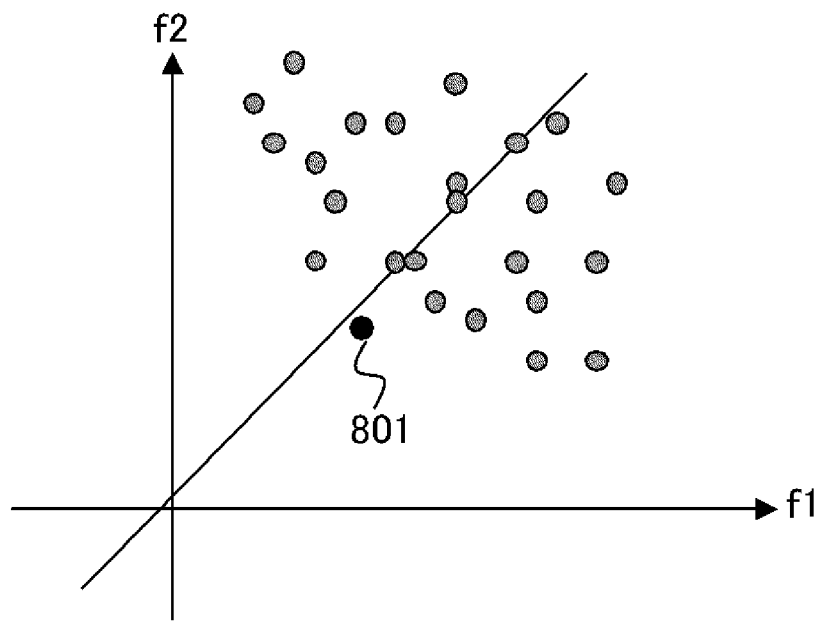
FIG. 8 explains the center range specifying operation of an input parameter.

Then, the QE computation unit 103 extracts a point in the sample sets of input parameters 107 and the two objective functions (f1, f2) specified in relation to them in which almost f2=f1 and which is also nearest the origin, for example, a point represented by 801 in FIG. 8. It is assumed that input parameters corresponding to the point are (p1, ... p15) (step S402 in FIG. 4B).

Then, the QE computation unit 103 formulates a problem, using the approximation polynomial of the two objective functions that is computed and specified by the objective function polynomial approximation unit 102 and the swing width t of each parameter value of the sample sets of input parameters 107 (step S403 in FIG. 4B). Thus, a formulation, as exemplified below can be obtained.

$$F := \exists x_1 \exists x_2 \ldots \exists x_{15}; p_1 - t \leq x_1 \leq p_1 + t \text{ and}$$
$$p_2 - t \leq x_2 \leq p_2 + t$$

$$\text{and} \ldots \text{and } p_{15} - t \leq x_{15} \leq p_{15} + t$$

$$\text{and } y_1 = f_1(x_1, \ldots, x_{15}) \text{ and } y_2 = f_2(x_1, \ldots, x_{15}) \quad (9)$$

Each input parameter x_i moves around p_i by width t.

Then, the QE computation unit 103 solves the value F of Expression (9) according to a QE method (step S404 in FIG. 4B). As this result, the input parameters x1, ... , x15 are eliminated and the logical expression of two objective functions y1 and y2 and swing width t is outputted.

Then, the feasible region display unit 104 shown in FIG. 2 displays the feasible region of the two objective functions on a computer display while modifying the value of swing width t, according to the logical expression between the arbitrary two objective functions computed by the QE computation unit 103 (step S405 in FIG. 4B).

In this case, it is preferable to select t in such a way that the region includes the sample sets of input parameters 107 and also is reduced.

Figure 9A:
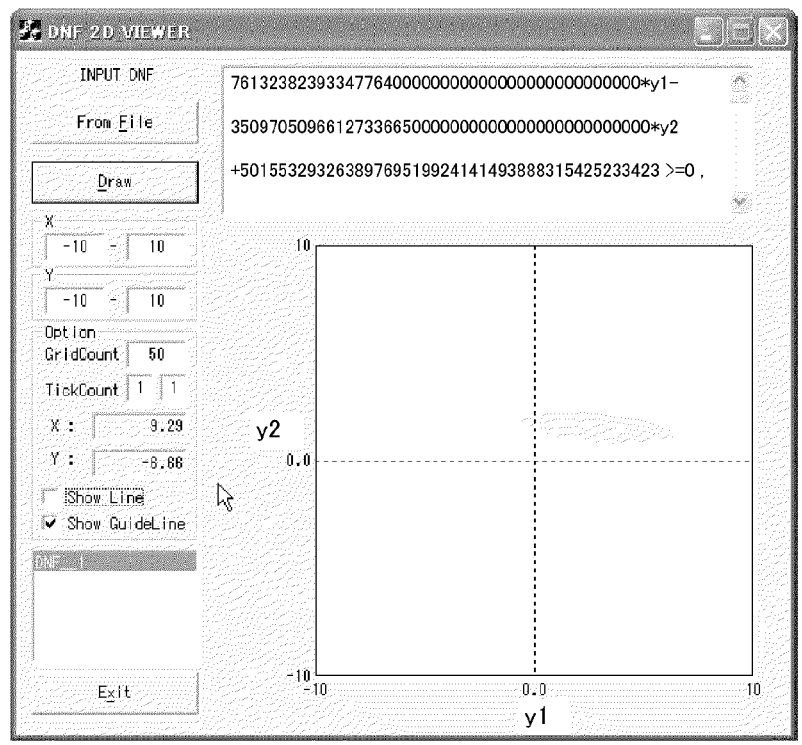
FIG. 9A shows an example of feasible region display (No. 3).
Figure 9B:
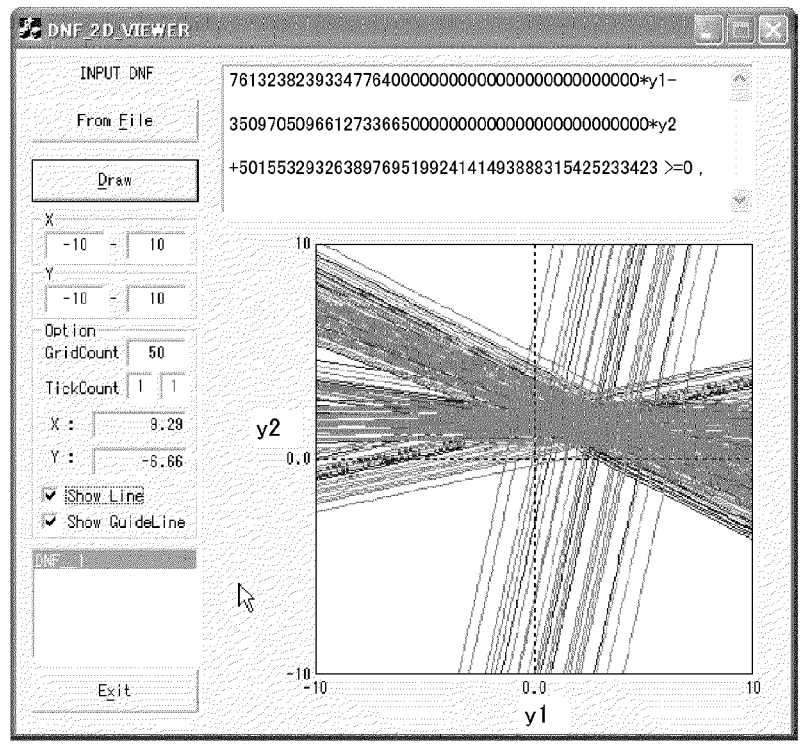
FIG. 9B shows an example of feasible region display (No. 4).

FIG. 9A shows an example of the feasible region display obtained by using sample sets of input parameters 107 corresponding to an actual slider shape. FIG. 9B shows an example of the feasible region display in which the boundaries of a logical expression are also displayed. In this example, it is a graph in which the amount of slider fly at a low altitude (0 m), the amount of slider fly at a high altitude (4200 m) and their relation are a first objective function f1, a second objective function f2, and y1 and y2, respectively.

Since the inclination of a Pareto curve in this graph is −1/8~1/5, it is sufficient if the ratio of weight values in a weight vector, needed to weight these two objective functions and to obtain a single objective function (see Expression (1)) is 1 vs. 8~1 vs. 5.

Thus, in the process of the feasible region display unit 104 shown in FIG. 2, firstly a user can estimate a weight value in a weight vector in the case where optimization by a single objective function (see Expression (1)) is used, from feasible region display on a display (step S205 in FIG. 3). A user can notify the system of the weight value ratio in a weight vector, for example, by specifying the overall inclination of the feasible region on the display using a mouse, which is not shown in FIG. 2, and the like. Alternatively, the system can automatically detect the weight value ratio according to a prescribed algorism.

As described in FIG. 7, in the process of the feasible region display unit 104 shown in FIG. 2, a user can easily recognize the Pareto boundary of two objective function as a boundary in the lower edge part near the coordinate origin in the feasible region display on a display intuitively and can anticipate the limit value of the optimization (step S206 in FIG. 3). A user can notify the system of the limit value, for example, by specifying the limit area on the feasible region boundary on the display, using a mouse, which is not shown in FIG. 2, and the like. Alternatively, the system can automatically detect the limit value according to a prescribed algorism.

Figure 10:
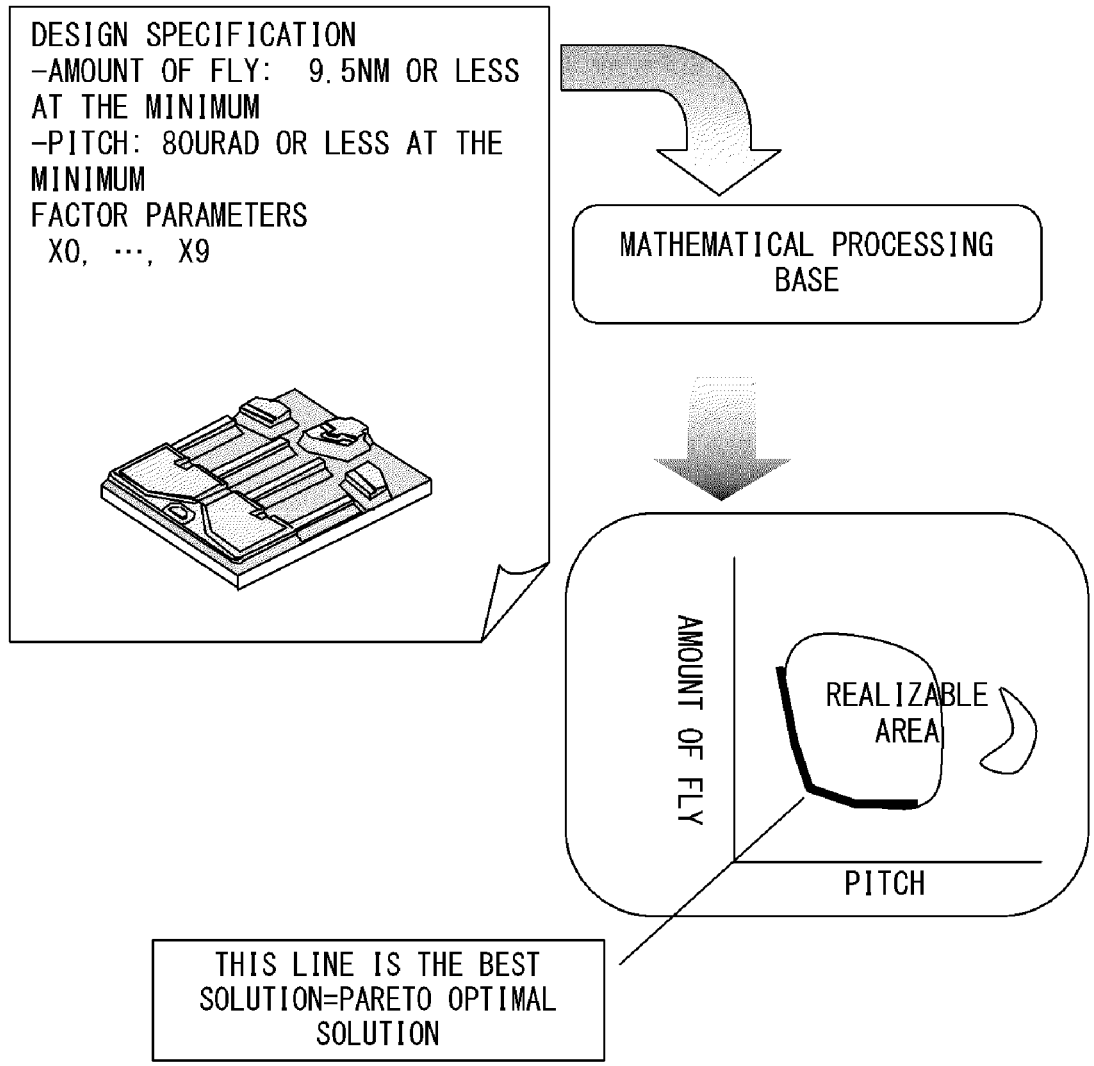
FIG. 10 explains the merit of feasible region display on a formula manipulation base.

Specifically, as shown in FIG. 10, in the preferred embodiment of the present invention, a multi-objective optimization process can be performed on the basis of the formula manipulation by polynomial approximation and a Pareto optimal solution can be displayed in the mathematical expression as it is by a QE method. Therefore, a Pareto optimal solution can be easily obtained.

In the above feasible region display process, a user can efficiently specify the ratio of weight values in a weight vector and a Pareto boundary for each objective function while sequentially specifying two objective functions.

After the above operations, the single objective optimization unit 105 shown in FIG. 2 computes a single objective function value obtained as the weighted linear sum of objective functions (see Expression (1)) of the sets of input parameters 108, using each objective function polynomial computed by the objective function polynomial approximation unit 102 and the ratio of weight values in a weight vector determined by a user in the feasible region display unit 104 and computes the candidate set of input parameters 108 whose single-objective function value becomes a minimum (step S207 in FIG. 3). In this case, the number of the input parameter sets 108 is 10,000~20,000.

In this case, since in the computation of each objective function value, flying height computation is not actually conducted and approximation polynomial is used, very high-speed computation is possible. Furthermore, since in the operation of the feasible region display unit 104, a value appropriately specified by a user is used for the weight values in a weight vector, used when a single objective function value is computed according to Expression (1), the repetitious computation of continuously modifying the weight vector is not necessary.

Lastly, the actual flying height computation optimization unit 106 shown in FIG. 2 applies detailed flying height computation to the candidate set of input parameters whose single objective function value becomes a minimum, computed by the single objective function optimization unit 105 and computes a single objective function value obtained as the weighted linear sum of objective functions obtained by the detailed flying height computation (step S208 in FIG. 3). For each objective function then, one obtained by actual flying height computation is used, and for the weight vector, the same one as used in the single objective function optimization unit 105 or one obtained by somewhat modifying it is used, Then, the actual flying height computation optimization unit 106 determines whether the optimization almost converges referring the limit value of an objective function predicted in the earlier-described feasible region display process (step S209 in FIG. 3).

If the optimization does not converge yet and it is determined that the determination in step S209 is no, the flow returns to step S207, the weight value in the weight vector is somewhat modified and the optimization process in steps S207 and S208 are performed again.

If the optimization converges and it is determined that the determination in step S209 is yes, the actual flying height computation optimization unit 106 outputs an input parameter set 108 whose single objective function value obtained then becomes a minimum as an optimal set of slider shape parameters 109 (step S210 in FIG. 3).

<Detailed Operation of Feasible Region Display in the Preferred Embodiment of the Present Invention>

Next, the more detailed operation of the feasible region display unit 104 shown in FIG. 2 is described below with reference to the drawings FIGS. 11~18B.

Figure 11:
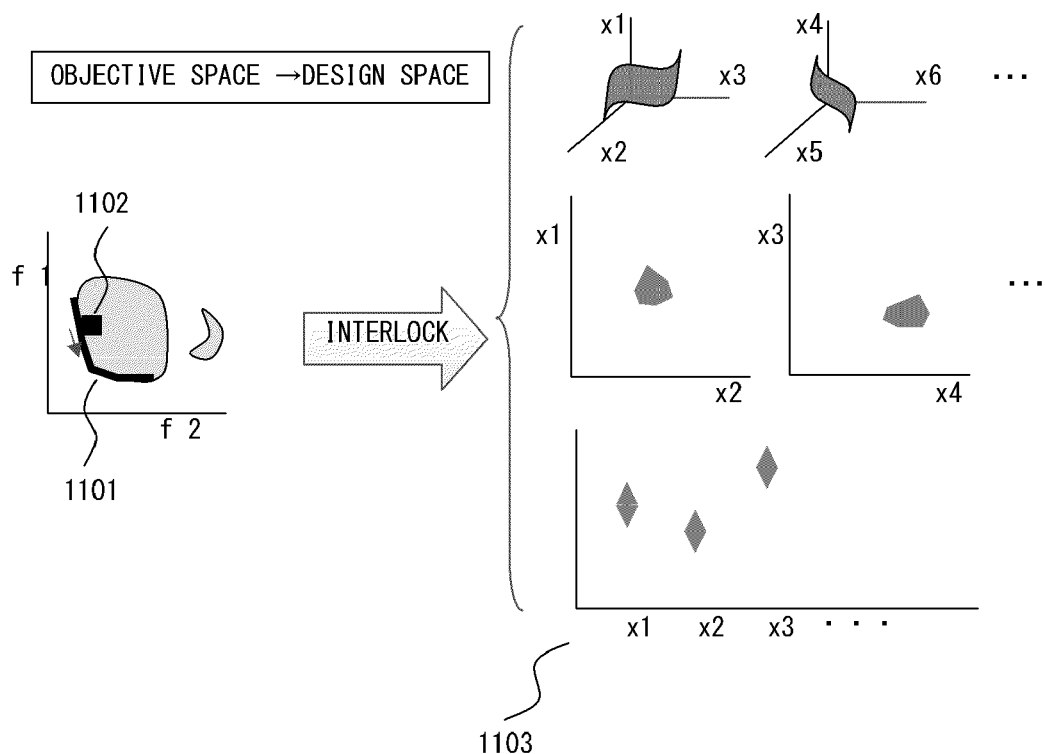
FIG. 11 explains the first function of a feasible region display unit 104 (No. 1).

The feasible region display unit 104 emphatically displays a Pareto optimal solution part (a Pareto boundary) in the feasible region displayed on a display as a first function, as indicated as 1101 in FIG. 11. Then, as a user traces the Pareto boundary by a mouse and the like, the feasible region display unit 104 displays a state in which design parameters specified in advance by a user (an arbitrary combination of factors constituting an input parameter set 108) change corresponding to the user's trace in a two-dimensional or three-dimensional coordinate, as shown as 1103 in FIG. 11. Not only when tracing a Pareto boundary but even when tracing from the right top of the feasible region toward the Pareto boundary by a mouse and the like, the state in which design parameters change is displayed in the same way.

Figure 1A:
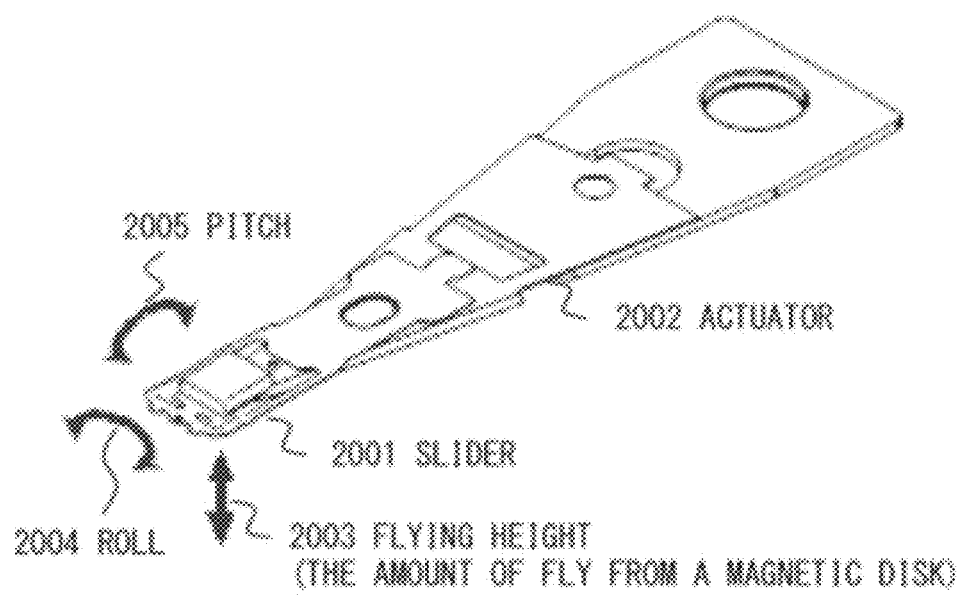
FIG. 1A shows the slider of a hard disk.
Figure 1B:
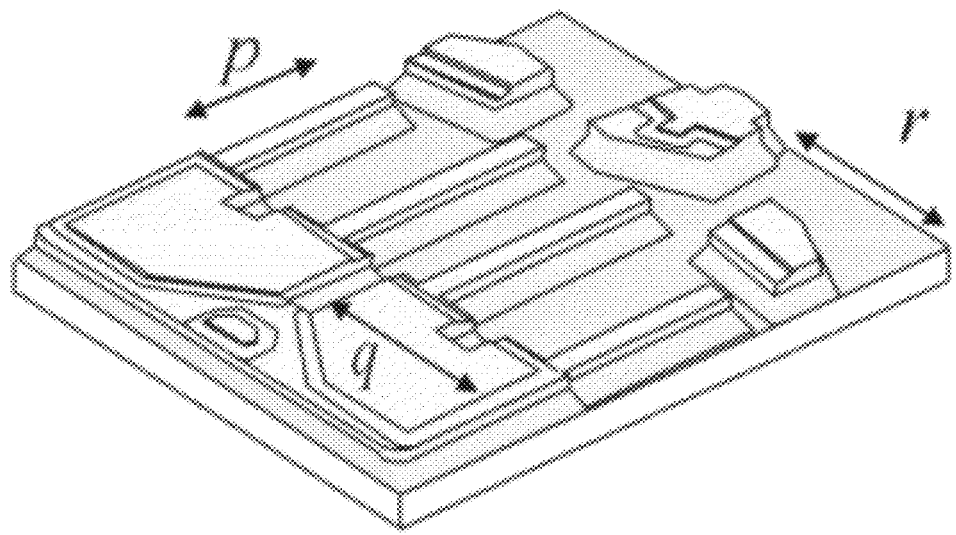
FIG. 1B shows the parameters of a slider shape.
Figure 1C:
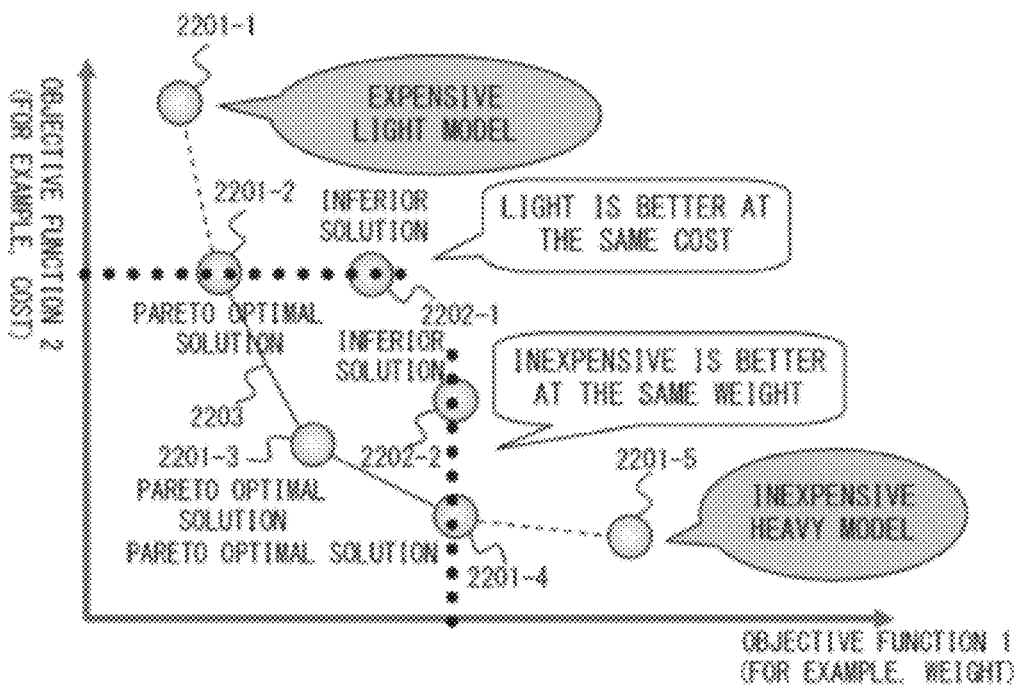
FIG. 1C explains multi-objective optimization.
Figure 1D:
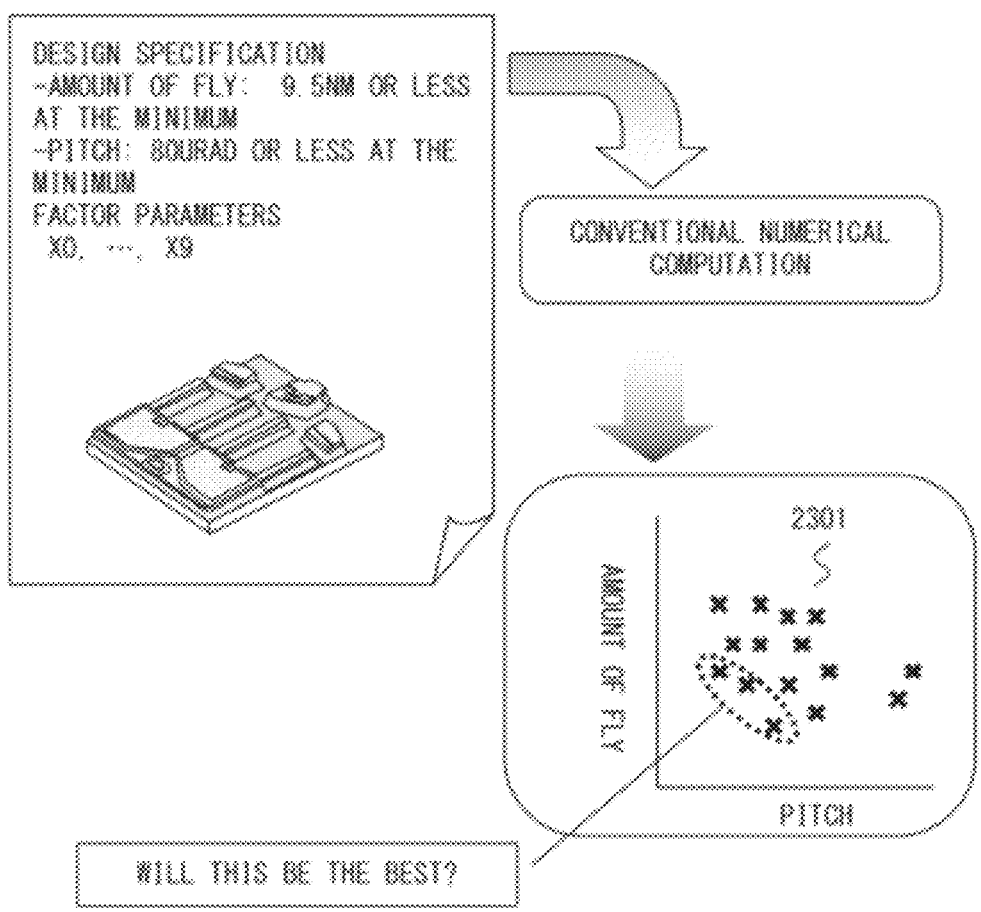
FIG. 1D shows the prior art (No. 1).
Figure 1E:
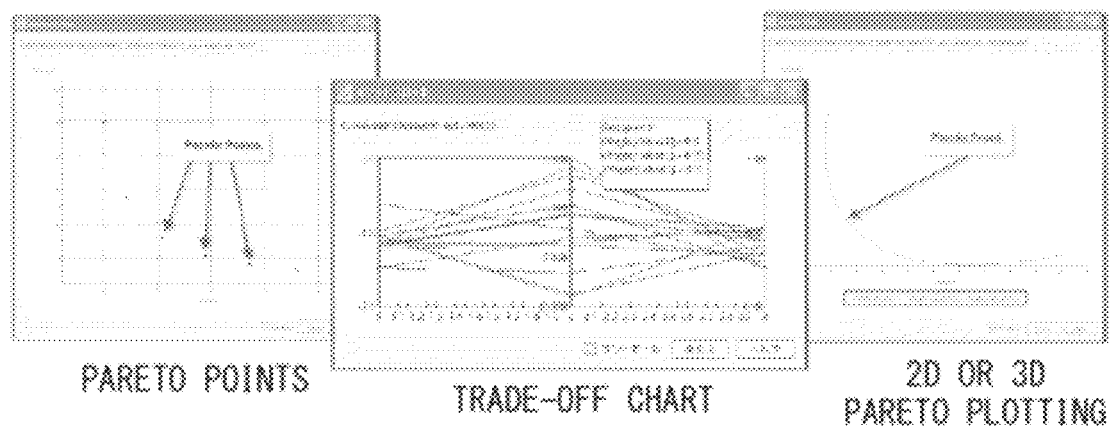
FIG. 1E shows the prior art (No. 2).

In this operation, a Pareto optimal solution can be emphatically displayed (1101 in FIG. 11) easily by emphatically displaying an expression point which appears on the utmost left side of each scanning line when the feasible region display unit 104 continuously paints over points where the logical expression of two objective functions computed by the QE computation unit (Expressions (5), (8), etc.) holds true while sweeping each point on the two-dimensional plotting plane of arbitrary two objective functions. This fact becomes a very advantageous feature considering that conventionally it is very difficult even to emphatically display a Pareto optimal solution since the Pareto optimal solution is plotted and displayed, for example, as shown in FIG. 1D.

Next, the operation of the feasible region display unit 104 displaying the change of design parameters in relation to the movement of Pareto specification by a user is shown by the operational flowchart shown in FIG. 12.

Figure 13A:
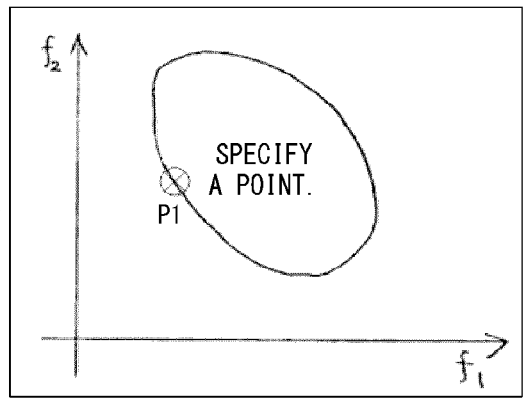
FIG. 13A explains the first function of the feasible region display unit 104 (No. 2).

Firstly, as shown in FIG. 13A, the feasible region display unit 104 specifies one point P1 on the Pareto boundary of the currently displayed objective functions f1 and f2 or its neighborhood (step S1201 in FIG. 12).

Then, the feasible region display unit 104 sets the neighbor area around the specified point P1 (step S1202 in FIG. 12). This area is expressed as [P1]. Although the shape of the area can be a rectangle or a circle, a rectangle is better taking computation efficiency into consideration.

Figure 13B:
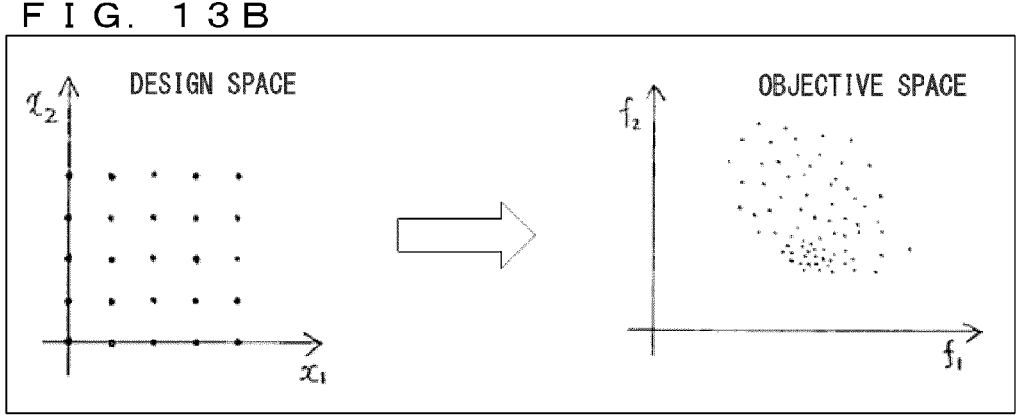
FIG. 13B explains the first function of the feasible region display unit 104 (No. 3).

Then, as shown in FIG. 13B, the feasible region display unit 104 maps each grating point meshed on the coordinate plane composed of two design parameters desired by a user in the design space to the objective space and computes a corresponding point, using the approximation polynomial of the two objective functions that are computed and specified by the objective function polynomial approximation unit 102 shown in FIG. 2 (step S1203 in FIG. 13). The number of grating points in the design space is specified by a user.

Figure 13C:
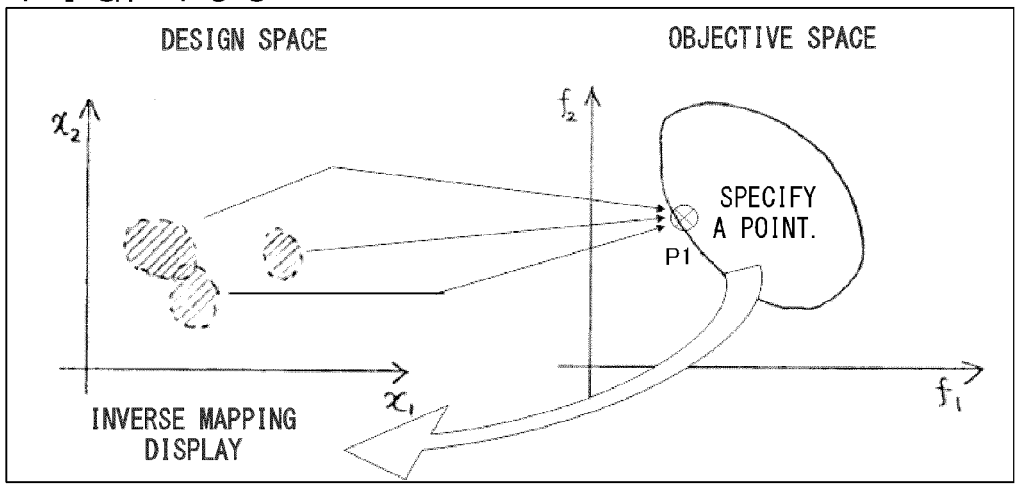
FIG. 13C explains the first function of the feasible region display unit 104 (No. 4).

Then, as shown in FIG. 13C, the feasible region display unit 104 displays only grating points in design space corresponding to points included in the area [P1] specified in step S1202 of the points in the objective space computed in step S1203, on a display (step S1204 in FIG. 12).

As a user traces the Pareto boundary by a mouse and the like, as shown as 1102 in FIG. 11, the feasible region display unit 104 repeats the above-described computation process and continuously updates the display in design space specified by a user.

Although in this example, the design space is two-dimensional, the same display can be realized when considering grating points in three-dimensional or one-dimensional design space.

By the above first function realized by the feasible region display unit 104, a user can intuitively know how the design parameters change when tracing a Pareto boundary.

Although in the above-described operation, a point in objective space is computed about each grating point in design space and their corresponding relation is computed, a corresponding area in the design space can also be directly computed by the QE method on the basis of the area [P1] in the objective space.

FIG. 14 is the operational flowchart of the feasible region display unit 104 realizing the operation.

Figure 15A:
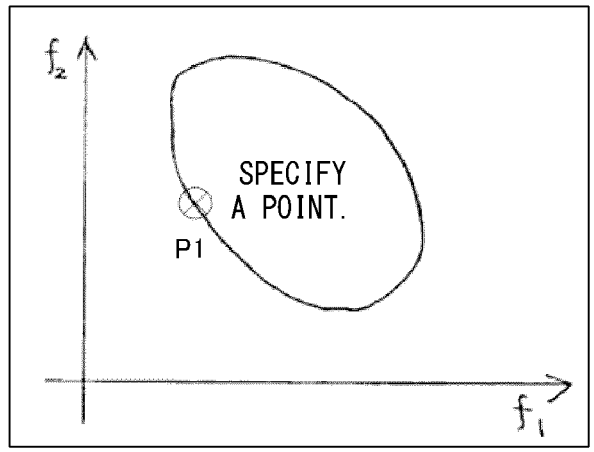
FIG. 15A explains the first function of the feasible region display unit 104 (No. 5).

Firstly, as shown in FIG. 15A, the feasible region display unit 104 specifies one point P1 on the Pareto boundary of the currently displayed objective functions f1 and f2 or its neighborhood (step S1401 in FIG. 14). It is assumed that the coordinates of P1 is (a, b).

Then, the feasible region display unit 104 sets the neighbor area around the specified point P1 (step S1402 in FIG. 14). This area is expressed as [P1]. It is assumed that this area is (a±Δo, b±Δo) for the specified point P1=(a, b) (see FIG. 15B).

Figure 15B:
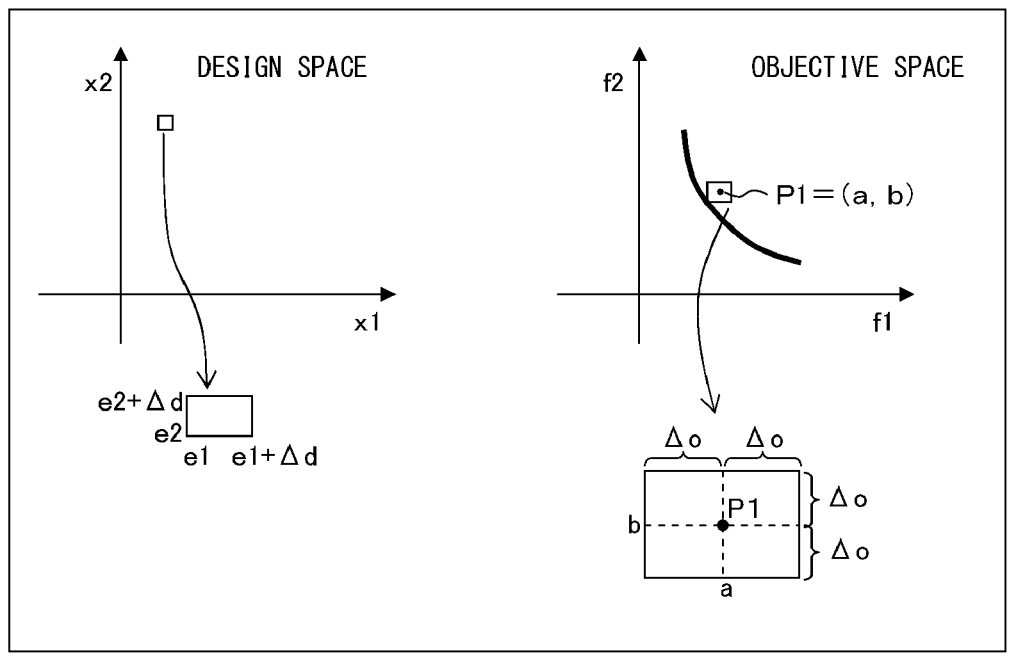
FIG. 15B explains the first function of the feasible region display unit 104 (No. 6).

Then, the feasible region display unit 104 formulates the following Expression (10) for the design space and the objective space using a minute amount Δd (step S1403 in FIG. 14) (See FIG. 15B).

$$\exists x_1 \exists x_2; e_1 \leq x_1 \leq e_1 + \Delta d \,\hat{}\, e_2 \leq x_2 \leq e_2 + \Delta d$$

$$\text{and } a - \Delta o \leq f_1(x_1, x_2) \leq a + \Delta o \,\hat{}\, b - \Delta o \leq f_2(x_1, x_2) \leq b + \Delta o \quad (10)$$

Furthermore, the feasible region display unit 104 computes an expression φ(e1, e2) that indicates a realizable feasible region of e1 and e2 by applying the QE method to the expression of the QE problem formulated in step S1403 (step S1404 in FIG. 14).

Then, the feasible region display unit 104 plots the expression φ(e1, e2) computed in step S1404 on the design space (step S1405 in FIG. 14).

As a user continuously traces the Pareto boundary emphatically displayed as shown 1601 in FIG. 16 by a mouse and the like in the feasible region displayed on a display, the feasible region display unit 104 displays a state in which the objective function value of comparison-target objective space specified in advance by the user changes corresponding to the user's trace, on a two-dimensional or three-dimensional coordinates, as exemplified as in FIG. 16, as the second function.

Not only a Pareto boundary is traced by a mouse and the like, but also even when trace is conducted from the right top of the feasible region toward the Pareto boundary, the state in which the objective function value of comparison-target objective space changes is displayed on the display in the same way.

Figure 18A:
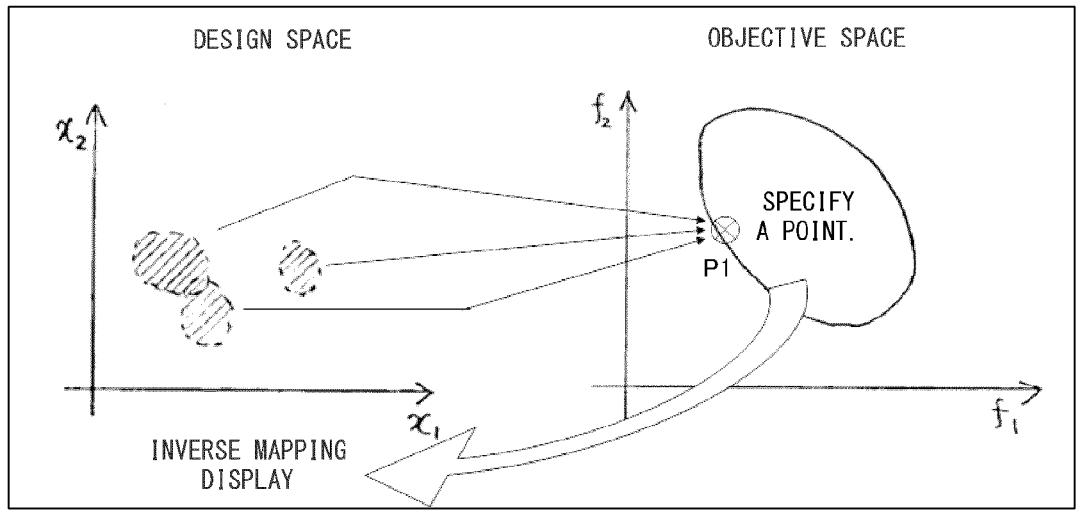
FIG. 18A explains the second function of the feasible region display unit 104 (No. 2).

In this operation, as shown in FIG. 18A, the feasible region display unit 104 obtains in advance a set of grating points on the design space in relation to the specified area [P1] in the objective space by the first function.

Figure 17:
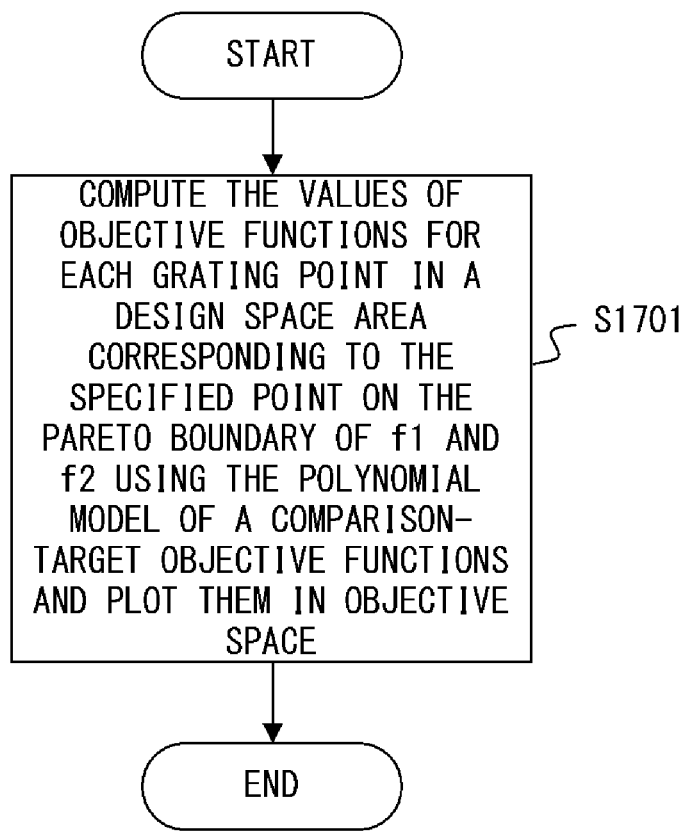
FIG. 17 is the operational flowchart of the second function of the feasible region display unit 104.
Figure 18B:
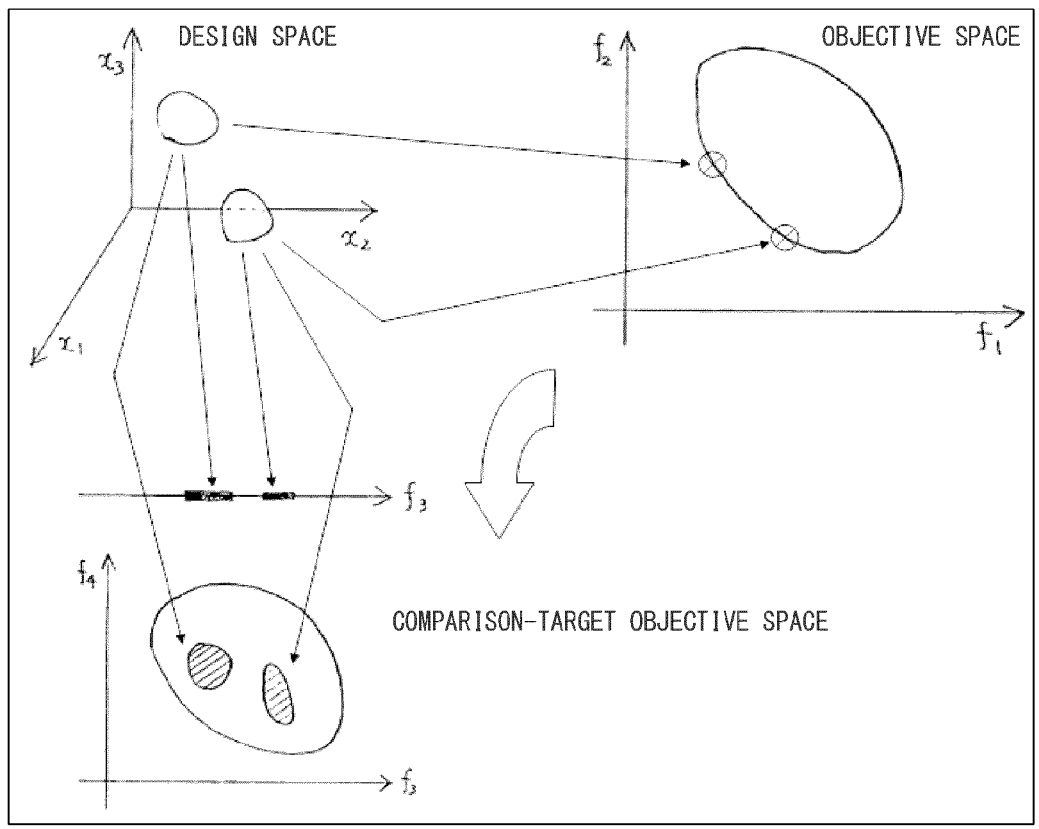
FIG. 18B explains the second function of the feasible region display unit 104 (No. 3).

In this state, the feasible region display unit 104 computes the values of objective functions constituting the comparison-target objective space for the set of grating points using the approximation polynomial computed by the objective function polynomial approximation unit 102 shown in FIG. 2 and as shown in FIG. 18B, plots them in the objective space (step S1701 in FIG. 17). The number of objective functions constituting the comparison-target objective space can be one, two or three and it or they are displayed one-dimensionally, two-dimensionally and three-dimensionally, respectively.

When tracing a Pareto boundary in certain objective space, by the second function realized by the feasible region display unit 104, a user can intuitively know how objective function values in other objective space change.

<Hardware Configuration of the Preferred Embodiment of the Present Invention>

FIG. 19 shows one example of the hardware configuration of a computer capable of realizing the above-described system.

A computer shown in FIG. 19 comprises a central processing unit (CPU) 1901, memory 1902, an input device 1903, an output device 1904, an external storage device 1905, a portable storage medium driving device 1906 in which a portable storage medium 1909 is inserted and a network connection device 1907, which are connected to each other by a bus 1908. The configuration shown in FIG. 19 is one example of the computer capable of realizing the above-described system and such a computer is not limited to this configuration.

The CPU 1901 controls the entire computer. The memory 1902 is a PAM and the like for temporarily storing a program or data stored in the external storage device 1905 (or the portable storage medium 1909) when executing the program, updating the date and the like. The CPU 1901 controls the entire computer by reading the program into the memory 1902 and executing it.

The input device 1903 comprises, for example, a keyboard, a mouse and the like and their interface control devices. The input device 1903 detects an input operation of the keyboard, the mouse and the like by a user and notifies the CPU 1901 of the detection result.

The output device 1904 comprises a display, a printer and the like and their interface control devices. The output device 1904 outputs data under the control of the CPU 1901 to the display and the printer.

The external storage device 1905 is, for example, a hard-disk storage device and is mainly used to store various pieces of data and various programs.

The portable storage medium driving device 1906 accommodates portable storage medium 1909, such as an optical disk, SDRAM, compact flash and the like and plays the auxiliary role of the external storage device 1905.

The network connection device 1907 connects a communication line, such as a local area network (LAN), a wide area network (WAN) and the like.

A system according to this preferred embodiment can be realized by the CPU 1901 executing the program mounting the functional blocks shown in FIG. 2. The program can be recorded in the external storage device 1905 or the portable storage medium 1909 and can be distributed. Alternatively, it can be obtained from a network by the network connection device 1907.

Although in the above preferred embodiment of the present invention, the present invention is used as a design support device for supporting the slider design of a hard disk, the present invention is not limited to this and can also be applied to various devices for supporting design while performing multi-objective optimization.

According to the present invention, objective functions can be approximated by a formula, such as a polynomial and the like using several sample sets of design parameters, of the design parameters of the slider shape of a hard disk and the like and the expression can be computed by a formula manipulation method. Since input parameters can be handled as they are, the logical relation and input/output relation between objective functions can be easily obtained.

More specifically, when tracing a Pareto boundary in certain objective space, a user can intuitively know how design parameters change.

Furthermore, when tracing a Pareto boundary in certain objective space, a user can intuitively know how objective function values in other objective space change.

What is claimed is:

1. A multi-objective optimal design support device for supporting determination of an optimal set of design parameters by inputting a plurality of sets of design parameters, computing a plurality of objective functions according to a prescribed computation and applying a multi-objective optimization process to the plurality of objective functions, the multi-objective optimal design support device comprising:

a processing unit that executes:

a sample-set objective function computation unit for computing sets of the plurality of objective functions corresponding to a prescribed number of sample sets of the design parameters;

an objective function approximation unit for mathematically approximating the objective functions using the prescribed number of the sample sets of the design parameters and the sets of the plurality of objective functions computed corresponding to the prescribed number of the sample sets of the design parameters;

an inter-objective-function logical expression computation unit for computing a logical expression indicating a logical relation between arbitrary objective functions of the plurality of the mathematically approximated objective functions, as an inter-objective-function logical expression;

an objective space display unit for displaying a region that values of the arbitrary objective functions can take, as a feasible region in an objective space corresponding to the arbitrary objective functions according to the inter-objective-function logical expression; and an objective space corresponding design space display unit for displaying a point or area in a design space, corresponding to arbitrary design parameters corresponding to a point or area specified by a user in a feasible region of an objective space corresponding to the arbitrary objective functions displayed by the objective space display unit; and a memory that stores said units.

2. The multi-objective optimal design support device according to claim 1, wherein
the objective space corresponding design space display unit displays a grating point corresponding to the point or area specified by the user in the feasible region of the objective space, computed according to the inter-objective-function logical expression, of grating points at prescribed intervals in the design space corresponding to the arbitrary design parameters.

3. The multi-objective optimal design support device according to claim 1, wherein
the objective space corresponding design space display unit computes a logical expression indicating a logical relation between the objective space and the design space and displays the point or area in the design space corresponding to the point or area specified by the user in the feasible region of the objective space, according to the computed logical expression.

4. The multi-objective optimal design support device according to claim 1, wherein
the design parameters are parameters for determining a shape of a slider unit of a hard-disk magnetic storage device.

5. The multi-objective optimal design support device according to claim 1, wherein
the design parameters are eliminated from the arbitrary objective functions in the inter-objective-function logical expression.

6. A multi-objective optimal design support device for supporting determination of an optimal set of design parameters by inputting a plurality of sets of design parameters, computing a plurality of objective functions according to a prescribed computation and applying a multi-objective optimization process to the plurality of objective functions, the multi-objective optimal design support device comprising:
a processing unit that executes:
a sample-set objective function computation unit for computing sets of the plurality of objective functions corresponding to a prescribed number of sample sets of the design parameters;
an objective function approximation unit for mathematically approximating the objective functions using the prescribed number of the sample sets of the design parameters and the sets of the plurality of objective functions computed corresponding to the prescribed number of the sample sets of the design parameters;
an inter-objective-function logical expression computation unit for computing a logical expression indicating a logical relation between arbitrary objective functions of the plurality of the mathematically approximated objective functions, as an inter-objective-function logical expression;
an objective space display unit for displaying a region that values of the arbitrary objective functions can take, as a feasible region in an objective space corresponding to the arbitrary objective functions according to the inter-objective-function logical expression;
an objective space corresponding design space computation unit for computing a point or area in a design space, corresponding to arbitrary design parameters corresponding to a point or area specified by a user in a feasible region of an objective space corresponding to the arbitrary objective functions displayed by the objective space display unit; and
a comparison-target objective space display unit for displaying a point or area corresponding to the point or area in the design space, computed by the objective space corresponding design space computation unit, in a comparison-target objective space corresponding to an arbitrary comparison-target objective function specified as a comparison target by a user; and a memory that stores said units.

7. The multi-objective optimal design support device according to claim 6, wherein
the design parameters are parameters for determining a shape of a slider unit of a hard-disk magnetic storage device.

8. A non-transitory storage medium on which is recorded a program for enabling a computer to support determination of an optimal set of design parameters by inputting a plurality of sets of design parameters, computing a plurality of objective functions according to a prescribed computation and applying a multi-objective optimization process to the plurality of objective functions, the program enabling the computer to perform:
computing sets of the plurality of objective functions corresponding to a prescribed number of sample sets of the design parameters;
mathematically approximating the objective functions using the prescribed number of the sample sets of the design parameters and the sets of the plurality of objective functions computed corresponding to the prescribed number of the sample sets of the design parameters;
computing a logical expression indicating a logical relation between arbitrary objective functions of the plurality of the mathematically approximated objective functions, as an inter-objective-function logical expression;
displaying a region that values of the arbitrary objective functions can take, as a feasible region in an objective space corresponding to the arbitrary objective functions according to the inter-objective-function logical expression; and
displaying a point or area in a design space, corresponding to arbitrary design parameters corresponding to a point or area specified by a user in a feasible region of an objective space corresponding to the displayed arbitrary objective functions.

9. The storage medium according to claim 8, wherein
the displaying the point or area displays a grating point corresponding to the point or area specified by the user in the feasible region of the objective space, computed according to the inter-objective-function logical expression, of grating points at prescribed intervals in the design space corresponding of the arbitrary design parameters.

10. The storage medium according to claim 8, wherein
the displaying the point or are computes a logical expression indicating a logical relation between the objective space and the design space and displays the point or area in the design space corresponding to the point or area specified by the user in the feasible region of the objective space, according to the computed logical expression.

11. The storage medium according to claim 8, wherein
the design parameters are parameters for determining a shape of a slider unit of a hard-disk magnetic storage device.

12. A non-transitory storage medium on which is recorded a program for enabling a computer to support determination of an optimal set of design parameters by inputting a plurality of sets of design parameters, computing a plurality of objective functions according to a prescribed computation and applying a multi-objective optimization process to the plurality of objective functions, the program enabling the computer to perform:

computing sets of the plurality of objective functions corresponding to a prescribed number of sample sets of the design parameters;

mathematically approximating the objective functions using the prescribed number of the sample sets of the design parameters and the sets of the plurality of objective functions computed corresponding to the prescribed number of the sample sets of the design parameters;

computing a logical expression indicating a logical relation between arbitrary objective functions of the plurality of the mathematically approximated objective functions, as an inter-objective-function logical expression;

displaying a region that values of the arbitrary objective functions can take, as a feasible region in an objective space corresponding to the arbitrary objective functions according to the inter-objective-function logical expression;

computing a point or area in a design space, corresponding to arbitrary design parameters corresponding to a point or area specified by a user in a feasible region of an objective space corresponding to the displayed arbitrary objective functions; and displaying a point or area corresponding to the point or area in the design space, computed by the objective space corresponding design space computation function, in a comparison-target objective space corresponding to an arbitrary comparison-target objective function specified as a comparison target by a user.

13. The storage medium according to claim 12, wherein the design parameters are parameters for determining a shape of a slider unit of a hard-disk magnetic storage device.

* * * * *